US011758960B2

(12) United States Patent
Choi

(10) Patent No.: US 11,758,960 B2
(45) Date of Patent: Sep. 19, 2023

(54) HEADWARE INTERFACE FOR ANIMALS

(71) Applicant: Woojin A. Choi, Solana Beach, CA (US)

(72) Inventor: Woojin A. Choi, Solana Beach, CA (US)

(*) Notice: Subject to any disclaimer, the term of this patent is extended or adjusted under 35 U.S.C. 154(b) by 62 days.

(21) Appl. No.: 16/918,271

(22) Filed: Jul. 1, 2020

(65) Prior Publication Data

US 2020/0329800 A1    Oct. 22, 2020

Related U.S. Application Data

(63) Continuation-in-part of application No. 16/219,732, filed on Dec. 13, 2018, now abandoned, which is a continuation-in-part of application No. 15/049,734, filed on Feb. 22, 2016, now abandoned.

(60) Provisional application No. 62/216,252, filed on Sep. 9, 2015.

(51) Int. Cl.
| A01K 13/00 | (2006.01) |
| A42B 1/00 | (2021.01) |
| A42B 1/04 | (2021.01) |
| A42B 1/045 | (2021.01) |
| A42B 1/006 | (2021.01) |

(52) U.S. Cl.
CPC ............ *A42B 1/045* (2013.01); *A01K 13/006* (2013.01); *A42B 1/006* (2013.01)

(58) Field of Classification Search
CPC ........ A01K 13/006; A42B 1/00; A42B 1/006; A42B 1/045
USPC .......................... 119/850, 856; 2/10, 171, 410
See application file for complete search history.

(56) References Cited

U.S. PATENT DOCUMENTS

| 4,969,317 A | * | 11/1990 | Ode ..................... | A01K 13/006 54/80.2 |
| 5,031,388 A | * | 7/1991 | Ode ..................... | A01K 13/006 54/80.2 |
| 5,163,272 A | * | 11/1992 | Finley ................. | A01K 13/006 54/80.1 |
| 5,519,895 A | * | 5/1996 | Barnes, Jr. ........... | A42B 1/08 2/425 |
| 5,893,173 A | * | 4/1999 | Bray .................... | A01K 13/006 119/850 |
| D503,846 S | * | 4/2005 | Gallagher ............ | A42B 3/08 D2/881 |
| 6,978,482 B2 | * | 12/2005 | Bray .................... | A01K 13/006 2/171 |
| 8,402,926 B1 | * | 3/2013 | Nunez ................. | A01K 13/006 119/850 |

FOREIGN PATENT DOCUMENTS

EP          1317887        *  6/2003

* cited by examiner

*Primary Examiner* — David J Parsley
(74) *Attorney, Agent, or Firm* — Donn K. Harms

(57) ABSTRACT

A headwear device is provided for the comfortable and secure positioning of a hat on the head of an animal such as a dog. The device features a body having an interior adapted to engage the head of the animal with side portions having openings therein adapted for encircling the ears of the animal during wearing of the headwear. A position-adjustable fastener adapted for locating under the chin of the animal, is slidably engageable with both of two straps connected to opposing sides of the hat body. A slide adjuster on both of the first and second straps may be employed to cinch both straps and tighten the engagement on the head of the animal.

8 Claims, 23 Drawing Sheets

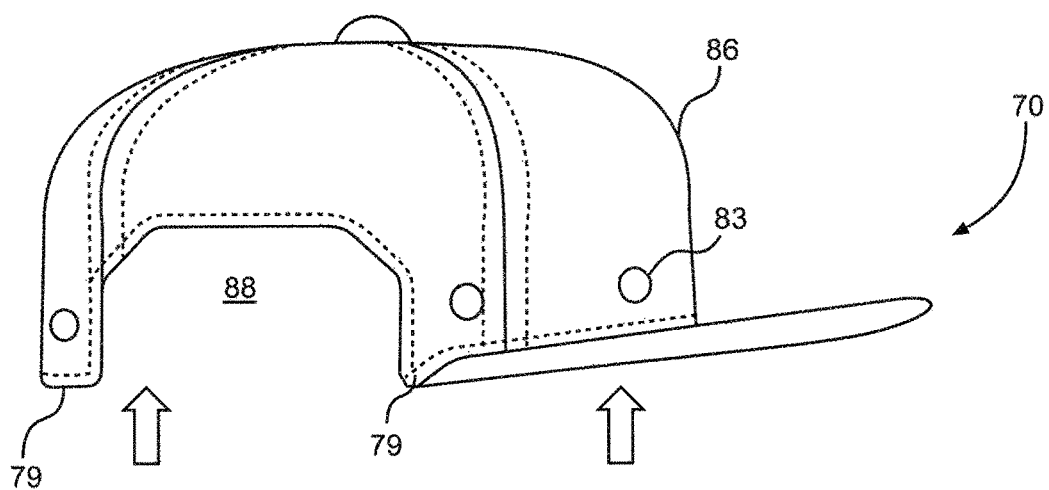
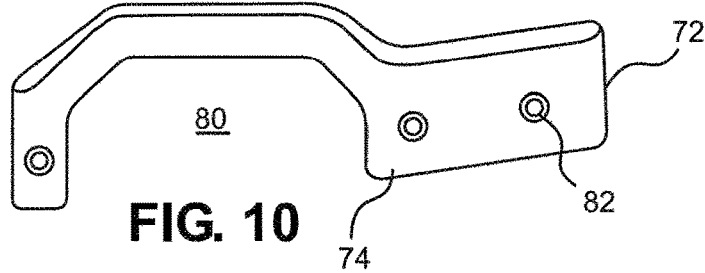
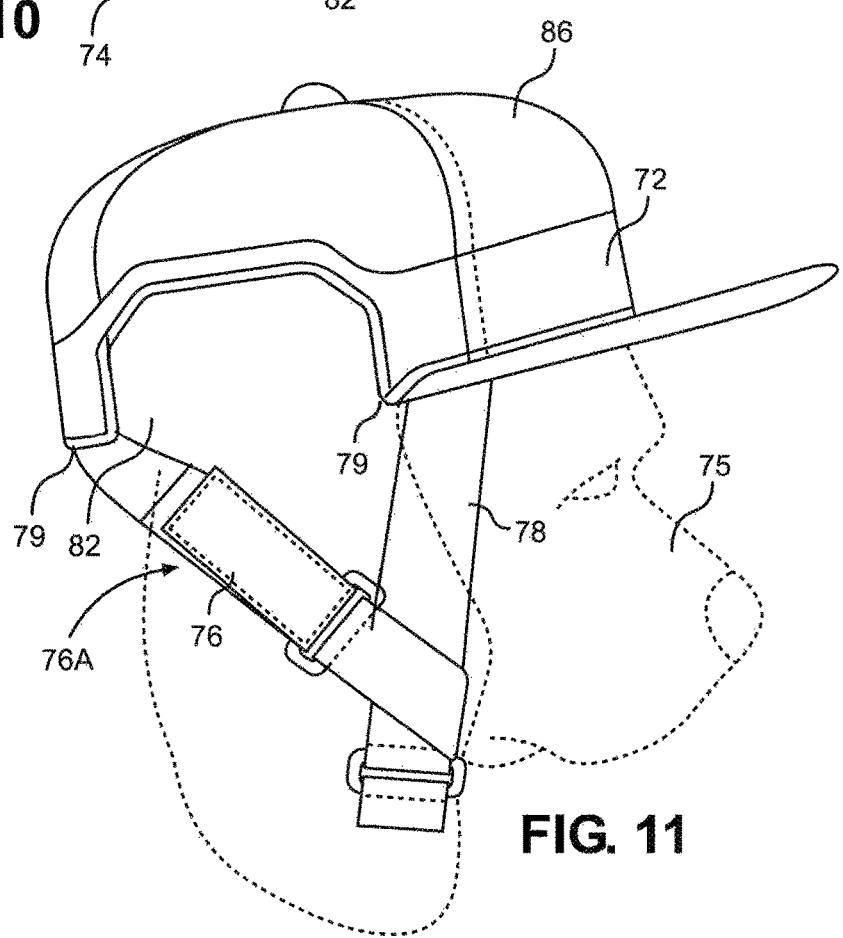

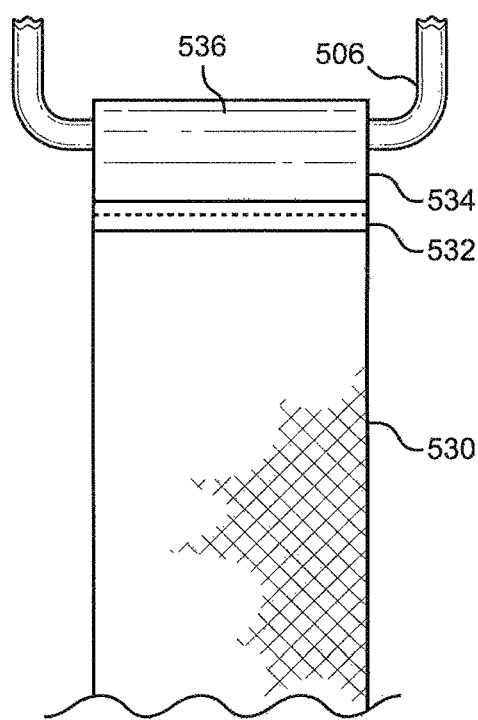
FIG. 24
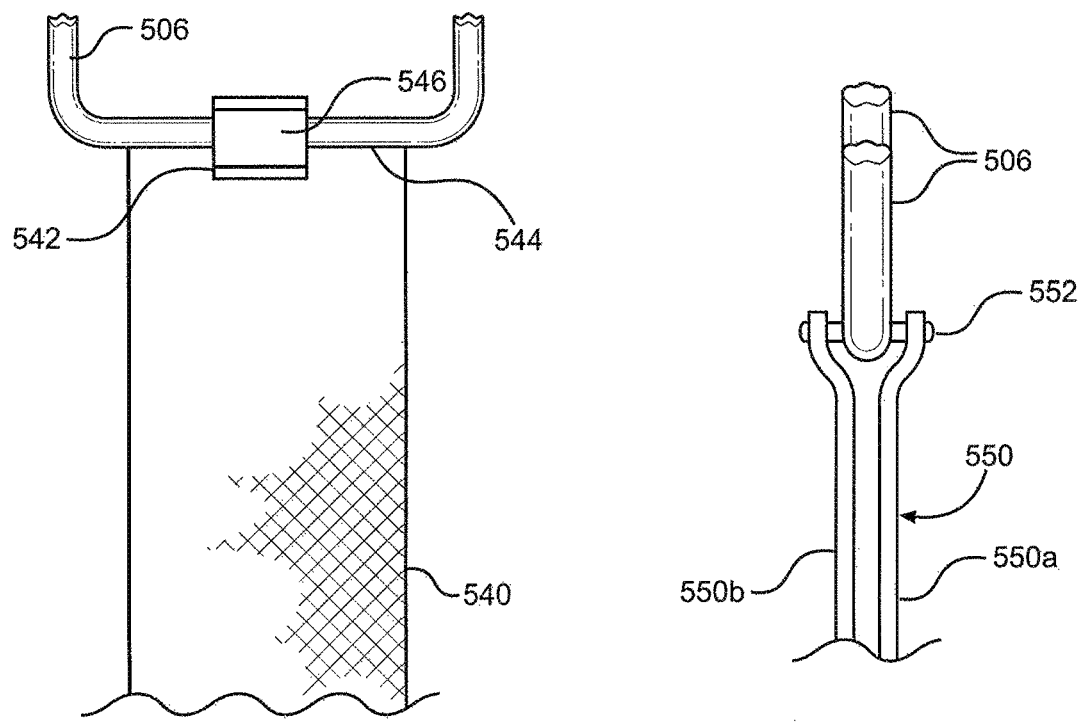
FIG. 25
FIG. 26

HEADWARE INTERFACE FOR ANIMALS

This Application is a Continuation in Part and claims the benefit of priority to U.S. Utility patent application Ser. No. 16/219,732 which has a filing date of Dec. 13, 2018 which is a Continuation in Part to U.S. patent Ser. No. 15/049,734 filed on Feb. 22, 2016, which in turn claims benefit of priority to U.S. Provisional Patent Application No. 62/216,252 filed on Sep. 9, 2015, all of which are considered fully incorporated herein in their entirety by this reference thereto.

FIELD OF THE INVENTION

The present invention relates generally to headwear. More particularly, the device relates to a headwear interface adapted for comfortable positioning on the head of an animal such as a dog, and for engagement to conventional headwear worn by humans such as caps and visors and the like, to thereby allow the dog or other animal to comfortably wear human headwear.

PRIOR ART

For centuries humans have had animals as pets, and particularly preferred by many are dogs. Over time, dogs unlike many animals have been domesticated to walk with humans and ride in vehicles calmly, and dogs generally tend to stay proximate to the human they accompany. Thus, dogs are capable of accompanying humans on virtually any outing or trip, where dogs are allowed.

During such outings, dog owners in recent times are well known to dress their animals in attire such as sweaters and the like for adornment or protection from the environment. Dog owners are also well known to place human attire on dogs to celebrate holidays, to promote a sports team, or for other reasons where a human may wish to have their dog attired in human clothing and clothing accessories.

Such clothing, in order to be worn by dogs, must be adapted from a human configuration to that of a dog, in the case of sweaters and such. In the case of headwear, human heads generally have a profile extending upward above the eyes, the distance of the forehead. The head of most dogs lacks this upward profile and is therefore not well adapted for wearing of human headwear without some type of interface body providing a mount to hold the headwear in place while maintaining its shape. Humans who wish for their dog to wear headwear to protect the eyes of the dog from overhead sunlight or rain or to help promote or celebrate a sports team or event for instance, are therefore challenged in trying to place headwear made for the generally circular and vertically profiled head of a human, upon a dog.

To place headwear such as a cap or visor or other hat designed for the human head on a dog, some type of interface is required to provide a comfortable fit for the dog's head and a stable engagement of the headwear. Additionally, some type of means to maintain the hat upon the top of the head of a dog, or the interface is generally required. As dogs frequently run, jump and roll, absent some type of restraint, the hat, as well as the interface will simply fall off. This problem is exacerbated when the headwear is uncomfortable and ill-fitting such as a hat simply tied to maintain it on the head of the dog, such that it would promote the dog to shake it from its head.

Further, because human headwear is designed as noted, for a head-profile much higher than that of a dog, the body of the device defining a headwear mount or interface component should include, as a means for a secure attachment and maintaining the shape of the headwear, some type of engagement structure adapted for mating to the hat. Additionally, the body of the device defining a mount or interface component must be adapted on one end to provide a comfortable fit as well as providing a sufficient contact with the head of the dog to remain stable. Still further, restraints for both the hat in its engagement to the body of the device providing the headwear mount or interface, and the hat when positioned on the head of the dog, are also preferred.

Prior art such as U.S. Pat. Nos. 4,969,317 and 5,031,388 have attempted to solve the problem of engaging headwear to animals such as dogs. However in both of these patents, the invention as taught, limits the user to a single design of a hat, which appears less than comfortable as taught, and do not provide for the employment by a user of any hat in a comfortable engagement to the head of a dog.

Another prior art patent, U.S. Pat. No. 5,893,173, (Bray) teaches the employment of a band with ties to hold a hat engaged upon the head of a dog. However the Bray reference simply teaches an annular band which is tied upon the head of a dog, but provides no manner to adapt the circumference of the first side of the band to a comfortable and secure engagement on the head of the dog, while concurrently allowing for a circumference of the opposing side of the band to engage larger, smaller or different types of hats.

As such there exists an unmet need, for a device and method providing a body forming an interface for the comfortable engagement of a human hat or cap or visor or the like, on the head of a dog, while maintaining the shape of the hat. Such a device should provide for easy engagement and disengagement of a wide variety of headwear in a wide variety of styles, securely, on one end of the body providing the interface. Further such a device should be adapted to be operatively positionable on the head of a dog with both comfort and stability. Such a device and method should provide for a secure and comfortable engagement of the body providing the mount for hat engagement, which a configuration adapted to contact a sufficiently wide surface area of the head of the dog to provide a stable and comfortable engagement, and to thereby minimize attempts by the dog to remove it. This engagement between the body of the device and the head of the animal should be adapted to maintain the body forming the headwear mount on the head of a dog during running, jumping, and other normal movements of the dog.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provisioning of a body component providing a hat interface configured for positioning and engagement between the head of a dog, and between hats, visors, and the like, which are originally designed for positioning on the human head. In another mode of the device, the body of the device can be included or subsequently engaged with a hat or headwear, which is pre-configured to the anatomy of the head of the dog, including an accommodation for the ears and their position.

The device in all modes includes a body component configured to maintain the shape and circumference of a hat expanded and engaged, and to maintain the position of the hat upon the head of the animal or dog. The body is formed of material which may be pliable and flexible but will maintain the shape of the hat in a fully or partially circumferential configuration and on the body which is concurrently engaged on the head of the animal, such as plastic or polymeric materials. The body is configured on a lower or first side, in a shape and configuration which accommodates the head shape and ears of a dog, and in doing so provides for a comfortable yet secure positioning of the lower or first side of the body, upon the head of a dog. The exterior circumference of the body providing this interface includes a sidewall configured for operative and secure engagement to headwear either generally configured for humans, but with openings adapted to allow for ear passage.

The body may be formed partially, or entirely of fabric, foam material, plastic, or polymeric material, depending on the configuration and preference of the user. If formed entirely of foam, a closed cell foam would provide a pliable yet shape-holding structure defining the body, which on the first side would be pliable and adapted to conform to the surface of the head of a dog. The body in a unitary or formed structure, could be formed in a planar or walled configuration from polymeric or plastic material, with the first side is similarly configured to be complimentary to the shape of the head of a dog, when this mode of the body is engaged within the circumference of a hat or headwear. It should be noted the body need not be a complete circle or annular configuration but could be formed with components forming the body which are engageable with the hat to maintain hat shape and keep it securely fastened on the dog's or animal's head.

In preferred modes of the device, on the exterior surface of the body communicating between the first and the second side, the exterior circumference would be formed such that it is approximately equal to or slightly smaller than the interior circumference of a headwear to be engaged thereto, adjacent the lower edge of the hat. Many such hats are adjustable in circumference so forming the circumference of the second side of the annular body to an industry medium will allow for most adjustable-sized hats to be sized to engage the circumference of the second side. When the body is formed with vertically disposed sidewalls, openings may be provided along opposing edges of the first side to accommodate the ears of a dog.

The body may also be formed of two types of material such as forming a second side and the sidewall circumference from a plastic or similar material and forming the first side and interior portion of foam or memory foam to allow for a pliable and comfortable conforming of the first side and interior to the head of the dog or animal. Other configurations are anticipated where the second side may rise to a dome or in a similar fashion to that of a human head, or for example a first side and interior surface within the sidewall is formed of pliable material such as open or closed cell foam, but contoured to generally conform to the shape of the head of a dog or animal.

Engagement of the body to the head of the dog or animal once the first side is positioned thereon, will preferably be augmented by a first set of straps engaged with opposite sides of the sidewall or other part of the body, or flexible members or straps engaged to the hat which operatively engages the sidewall. Distal ends of the this first set of straps will include complimentary engaging fasteners to allow engagement of both to each other under the neck of the dog; or, the straps may be a continuous elastic band with no distal ends. It is preferable that second or rear straps may also be provided on both sides of the device, which communicate between the first set of straps and a rearward position on the body of the device to provide extra support and stability.

Engagement of headwear such as a baseball cap, visor, or other hat to the second side or circumference of the formed body can simply be accomplished by adjusting the size of the headwear to a very tight frictional engagement of the circumference of the sidewall of the body adjacent the second side. Alternatively, clips providing a biased contact with the headwear, or engageable fasteners such as snaps, hook and loop fabric, or magnets may be employed to maintain the headwear on the second side of the body of the device. In addition, the body may be directly stitched or otherwise directly attached into the inner crown of the headwear.

In a preferred embodiment of the device, the body can be formed of substantially planar material which as noted includes open edges or cut outs on the first side to accommodate the ears of a dog. This planar body can engage with or into conventional headwear, or in a more preferred embodiment, it will engage with headwear also having openings in the side edges of the headwear requiring the second side of the device to be configured accordingly such that it follows the path of the inner crown inside such headwear. In this mode the body can be engaged with the headwear using snaps, hook and loop fabric, or by sewing the body into the interior circumference of the headwear.

It should be noted that the choice of overall size and shape of the body interfacing between the headwear and animal head may be altered from that which is shown herein and still be within the scope of this application. Such changes may be determined by factors such as cost to manufacture, the size and the shape of the hat and dog's or animal's head, the need for ventilation and other user preferences and requirements to comfortably and securely fit on the head of any of the many breeds of dogs and animals, which can widely vary.

Additionally, the surface of either the first or second side of the body and the circumference or sidewall may also be modified (e.g. perforated, ribbed, textured, etc.) to enhance aesthetics and function such as rigidity, ventilation, grip, weight, firmness and the like. Further, while this application describes the device herein with regard to having a formed body acting as an interface component for positioning between dogs and headwear, the device may be adapted as an interface for engagement of headwear to virtually any animal, and such is anticipated within the scope of this application.

It should be further noted, headwear and hats as used herein, is not limited to headwear worn by humans, but can be any functional or ornamental object. One example is the application of the device to hats that are similar to but smaller or larger than hats made for humans, where the size of the animal (e.g. puppies and small dog breeds like Chihuahuas) prevents the use of standard human-sized hats.

Still further, is briefly noted that upon a reading this disclosure, those skilled in the art will recognize various other means for carrying out these intended features of the invention. As such it is to be understood that other methods, applications and systems configured to provide an interface between headwear and the head of an animal may be configured to carry out these features and are therefore considered to be within the scope and intent of the present invention, and are anticipated.

With respect to the above description, before explaining at least one preferred embodiment of the herein disclosed invention in detail, it is to be understood that the invention is not limited in its application to the details of construction and to the arrangement of the components or steps noted in the following description or illustrated in the drawings. The invention herein described is capable of other embodiments and of being practiced and carried out in various ways that will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other interface components for positioning between hats and animals, and methods and systems for carrying out the several purposes of the present disclosed device. It is important, therefore, that the claims herein be regarded as including such equivalent construction and methodology insofar as they do not depart from the spirit and scope of the present invention.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing any limitations whatsoever thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting.

FIG. 10 is an exploded view of another alternative embodiment of the present invention showing a more planar body relatively positioned to headwear having cutouts registering with those of the body being inserted, or sewn into the headwear, thereby maintaining its shape;

FIG. 11 depicts the embodiment as shown in FIG. 10, operatively disposed upon the head of a dog using the securement straps and showing the cut-out or opening of the body when fully engaged with the headwear;

FIG. 24 is a front view of an alternative embodiment of a fastener used in an adjustable strap system in various embodiments of the present invention;

FIG. 25 is a front view of another alternative embodiment of a fastener used in an adjustable strap system in various embodiments of the present invention;

FIG. 26 is a side view of yet another alternative embodiment of a fastener used in an adjustable strap system in various embodiments of the present invention;

Figure 1:
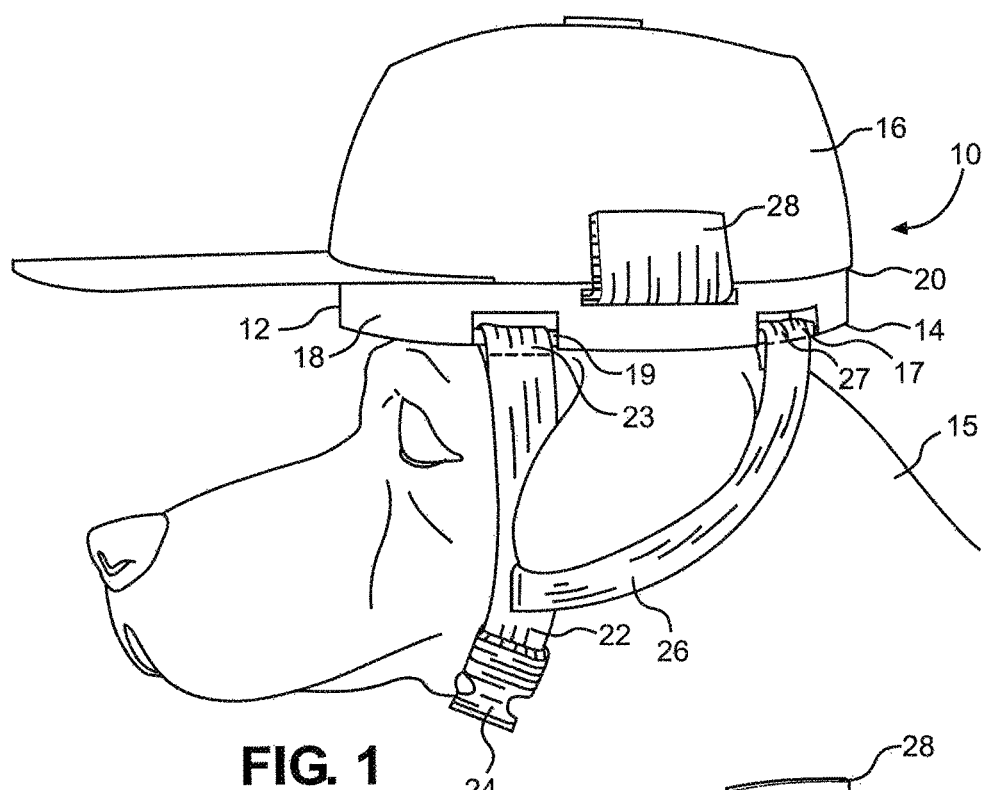
FIG. 1 depicts the device herein in an as-used position, secured with a first side positioned on the head of a dog, and with headwear operatively engaged upon a second side of the body of the device while maintaining its shape.

Other aspects of the present invention will be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only. Any such terms are not intended to be limiting or to imply that the device has to be used or positioned in any particular orientation.

Now referring to drawings in FIGS. 1-41, there is seen in FIG. 1 a preferred mode of the headwear interface device 10 herein, shown in as-used position, where the body 12 providing this interface, is positioned with a bottom side 14 operatively positioned on the head of an animal 15. Headwear such as a hat 16, as shown in FIG. 1, operatively engages an exterior sidewall 18 defining a circumference of the body 12 adjacent a bottom side 20 of the body 12. The use of a hat 16 is not meant to be limiting, and the headwear interface device 10 is meant to be utilized to fit all types of headgear onto the head of all types of animals 15, not just dogs. It is contemplated that the headwear interface device 10 may be used for all types of headwear, such as a hats, caps, visors, bonnets, helmets, hoods, headbands, head scarves, wimples, or any type of headgear to be worn on top of a head.

Also shown are primary straps 22 with a proximal end configured as a primary strap loop 23 engaged to the body 12 at a primary loop retaining bar 19 formed into the body 12, and extending to distal ends having cooperatively engageable fasteners 24. Secondary straps 26 are provided extending between an engagement to the body 12 at a proximal end formed with a secondary strap loop 27 engaged to the body 12 at a secondary loop retaining bar 17 formed into the body 12, and one each of the primary straps 22. This strap configuration is preferred in all embodiments of the device 10 in that it provides a V-shaped securement of the body 12 to the head of an animal 15 and thereby provides a secure mount and prevents the body 12 from dismounting from the animal's 15 head during movement. Only the left side of the headwear interface device 10 is shown in FIG. 1, as the strap configuration on the left side is mirrored on the right side of the headwear interface device 10.

The attachment method of the primary straps 22 and the secondary straps 26 to the body 12 is not meant to be limiting. It is contemplated that different attachment methods may be used without departing from the spirit and scope of the invention, such as directly attaching the primary straps 22 and secondary straps 26 to the body 12 with the use of snaps, buttons, clips, magnets, grommets, hook and loop fabric, or other securing fasteners as would occur to those skilled in the art for securement.

As can be discerned, the cooperatively engageable fasteners 24 removably connect the opposing distal ends of the primary straps 22 under the neck of the animal 15, and along with the secondary straps 26, if provided, hold the bottom side 14 of the body 12 operatively positioned on the head of the animal 15. The body 12, being of a more rigid form than the hat 16, absorbs some or all of the tension caused by engaging the fasteners 24 to the animal 15, thereby maintaining the shape of the hat 16 more closely to its original form.

Figure 2:
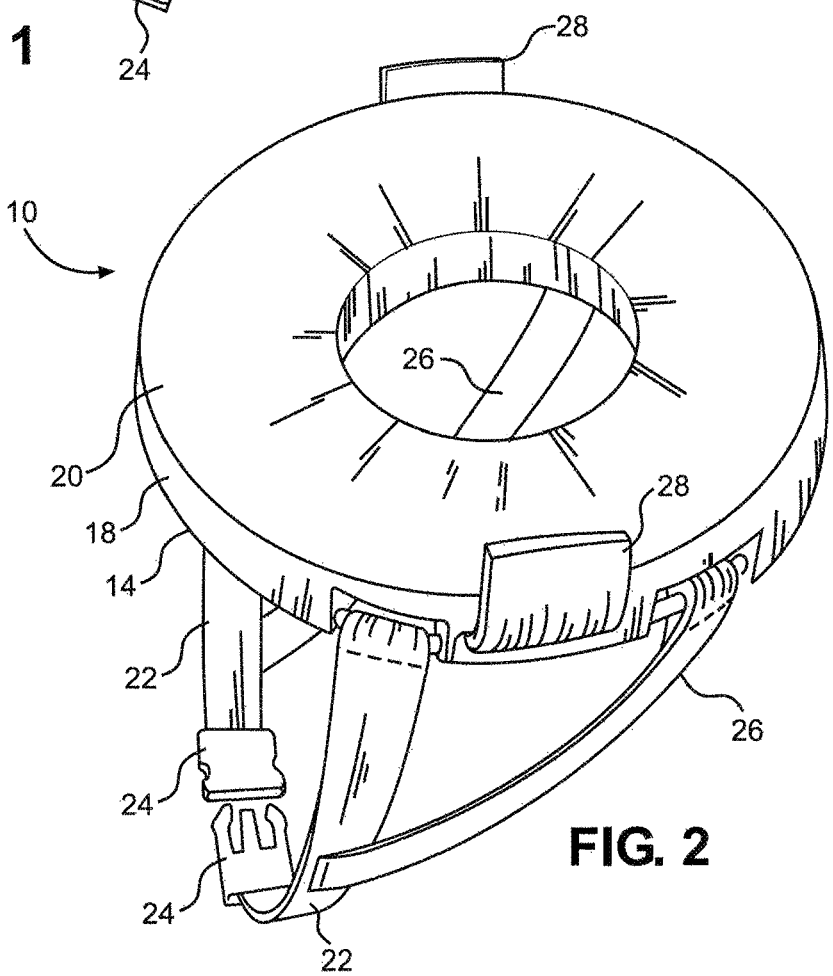
FIG. 2 is a perspective view of one embodiment of the device herein showing the second surface and sidewall of the body having securement straps engaged adjacent the first side, and hat retaining clips positioned adjacent the second side.

The depiction in FIG. 2 shows a perspective view of one embodiment of the device 10 as in FIG. 1, showing the top side 20 of the body 12 intersecting the sidewall 18 which defines the circumference of the body 12, which is adapted for engagement with a hat 16 thereon. The primary straps 22 are shown with cooperatively engageable fasteners 24 disengaged, and secondary straps 26 operatively positioned between the body 12 and primary straps 22. Also shown in FIG. 2 are retaining clips 28 disposed on the body 12 representing one preferred securing fastener to secure the hat 16 to the body 12 and extending in the direction of the sidewall 18. The retaining clips 28 may attach directly to a designated portion of the hat 16 or the clips 28 may pinch onto the hat 16 using two (2) or more opposing arms configured to grip the hat 16. Alternatively, as shown in FIGS. 1 and 2, the interior surface of the retaining clips 28 is sufficiently proximate to the sidewall 18 to form a gap smaller than the thickness of the hat 16 such that when the hat 16 is positioned on the body 12, the edge of the hat 16 between the clip 28 and the sidewall 18 is achieved to hold the hat 16 in position. This mode of securing fastener works well with human headwear as well as headwear with side openings as in FIG. 10.

Figure 3:
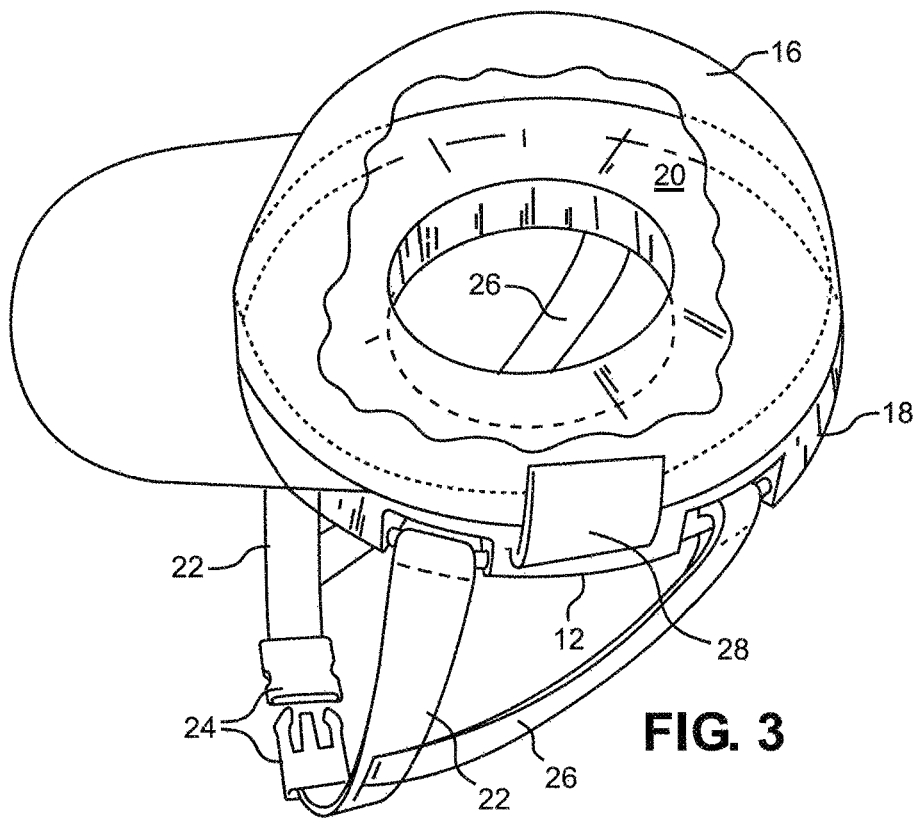
FIG. 3 depicts headwear in the form of a baseball cap, engaged about the sidewall defining the circumference of the second side of the body, and showing side portions of the hat disposed between biasing clips and the sidewall.

Shown in FIG. 3 is a depiction of this biased frictional engagement, as described above, of the hat 16 engaged about the sidewall 18 defining the circumference of the body 12. The sandwiched engagement of side portions of the hat 16 in the gap between the clips 28 and the sidewall 18 is also shown. It is contemplated that the clips 28 may be located at a lower position on the sidewall 18 of the body 12 so that the hat 16 may cover the entirety of the body 12 of the headwear interface device 10.

The use of retaining clips 28 on the body 12 of the headwear interface device 10 is not meant to be limiting. It is contemplated that the body 12 without the retaining clips 28 may be sufficient to hold the hat 16 without departing from the spirit and scope of the invention. Engagement of the hat 16 to the body 12 can be accomplished by adjusting the size of the hat 16 to a very tight frictional engagement to the sidewall 18, flush with the bottom side 20, of the body 12. The retaining clips 28 provide additional securement when the frictional engagement of the hat 16 to the body 12 is not sufficient, or if the additional securement is needed.

Figure 4:
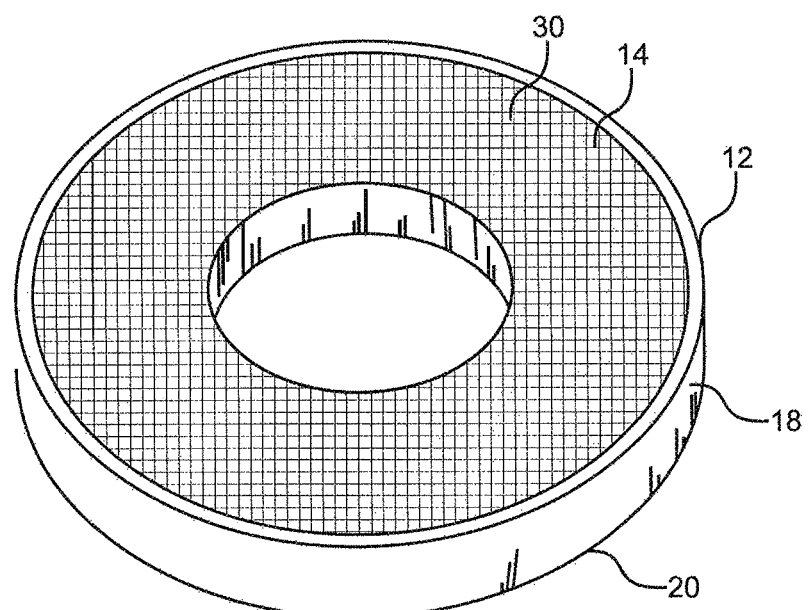
FIG. 4 is a view of a mode of the body showing the first side of the body having foam or memory foam therein, and the exterior and second side of the body formed from another material adapted for secure engagement to a hat while maintain the circular shape of the hat.

In the depiction of FIG. 4 is shown a view of the bottom side 14 of a body 12 in an embodiment of the device 10 featuring foam 30 such as open or closed cell type foam or memory foam forming an interior portion of the body 12 on the bottom side 14 thereof. This provides an interior surface adapted for conforming engagement to the contours of the head of an animal 15. The foam 30 of course may be non-planar and formed in a contoured recess on the bottom side 14 of the body 12, or in other embodiments where the surface of the bottom side 14 of the body 12 will comfortably conform and/or adapt to the contours and shape of the animal's head 15 on which the body 12 of the device 10 is engaged. Further, the annular shape of the horizontal cross section of the body 12 may be uniform as depicted (constant R minus r) or vary along the circumference of the body 12 in order to accommodate the ears and other features of the animal's head 15.

Also shown in FIG. 4 is a configuration of the body 12 where all or a portion of the sidewall 18 and the top side 20 of the body 12 are formed of a material different than that of the bottom side 14 of the body 12 and the interior of the body 12 adjacent the bottom side 14. For example, the sidewall 12 can be formed of material stiffer than that of foam such a polymeric material or plastic which is pliable, but will retain the size of the circumference defined by the sidewall 12 for more secure engagement thereof to hats 16.

Figure 5:
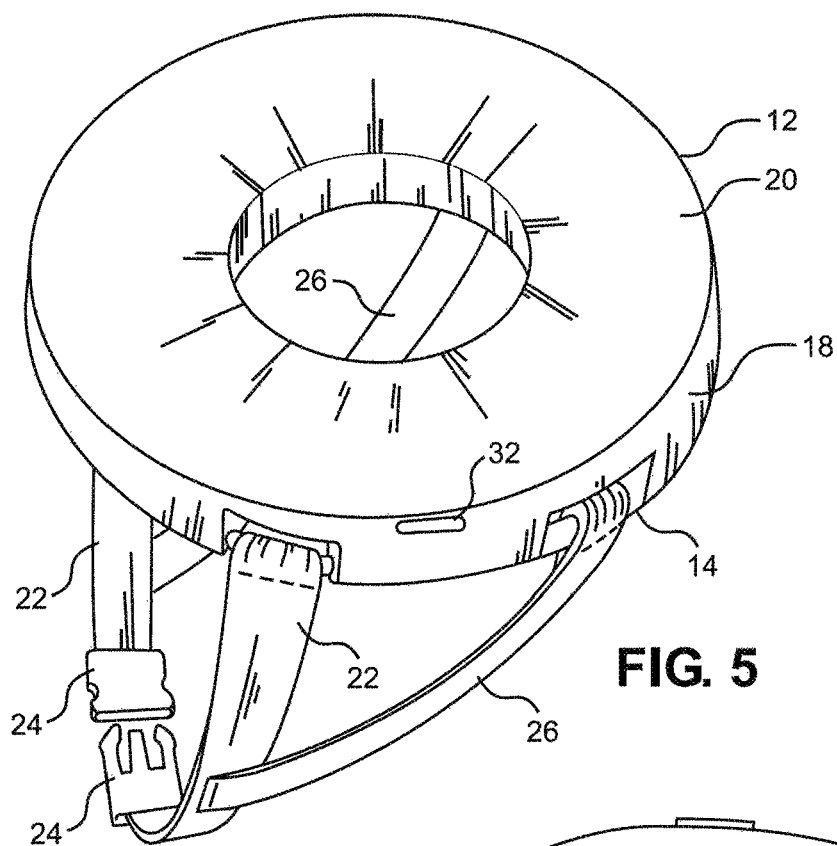
FIG. 5 depicts an alternative embodiment of the present invention wherein securement straps are secured through apertures formed in the exterior sidewall and a fastener is positioned on the body of the device, which is complimentary and engaging with a fastener positioned on a hat.

FIG. 5 depicts an alternative embodiment of device 10 where securing fastener 32 is positioned on the body 12, in a registered position to engage with a mating securing fastener 33 (see FIG. 6) positioned on a hat 16. Such securing fasteners 32 and 33 may be any complimentary fastener where two halves thereof easily engage and disengage to allow easy mounting and dismounting of a hat 16 to the body. For example, such securing fasteners 32 and 33 can be one or a combination of securing fasteners from a group including snaps, buttons, clips, magnets, grommets, hook and loop fabric, or other securing fasteners as would occur to those skilled in the art for removable securement of the hat 16 to the body 12.

Figure 6:
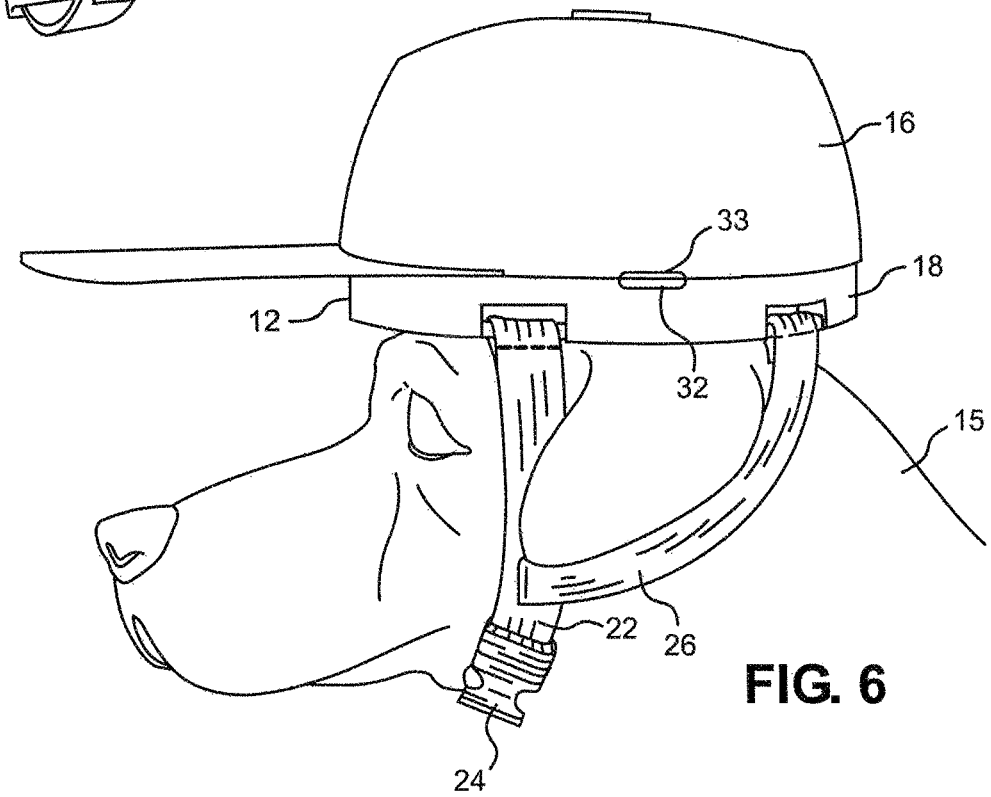
FIG. 6 depicts the device as in FIG. 5 in an as-used position with the body having a first side engaged on the head of a dog, and the hat secured about the sidewall circumference in a manner that retains its shape and held by the complimentary fasteners on both the hat and the body of the device.

Shown in FIG. 6 is the embodiment of the device 10 as shown in FIG. 5 where the body 12 is positioned in an as-used position, with the body 12 having a bottom side 14 comfortably and securely positioned on the head of an animal 15. The headwear 16 is shown secured about the sidewall 18, and held in this position by the cooperatively engaged complimentary fasteners 32 and 33 respectively located on the body 12 and a hat 16. It is contemplated that the fastener 32 may be located at a lower position on the sidewall 18 of the body 12 so that the hat 16 may cover the entirety of the body 12 of the headwear interface device 10.

Figure 7:
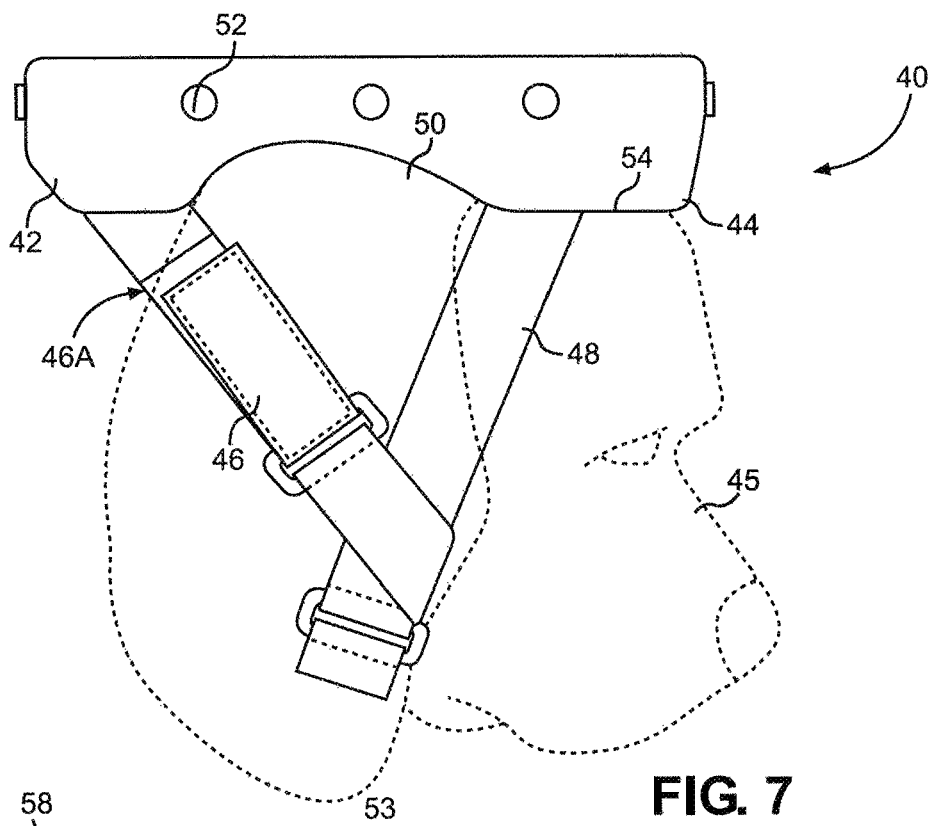
FIG. 7 depicts another alternative embodiment of the present invention wherein the body is formed in a substantially annular configuration similar to the shape of a hat such as in FIG. 8, and showing recesses formed in the first side edge and fasteners, which are complimentary to fasteners on the headwear for securement.

Depicted in FIG. 7 is an alternative embodiment of the Headwear Interface for Animals and generally designated 40. The device 40 is shown in an as-used position with the bottom side 44 of the body 42 engaged upon the head of an animal 45, such as a dog. The primary straps 48 are secured to the body 42 as noted above in other embodiments, and secondary straps 46 are provided communicating between a rear portion of the body 42 and the primary straps 48. The primary strap 48 is adjustable to allow for a customizable fit to varying animal head sizes.

Figure 8:
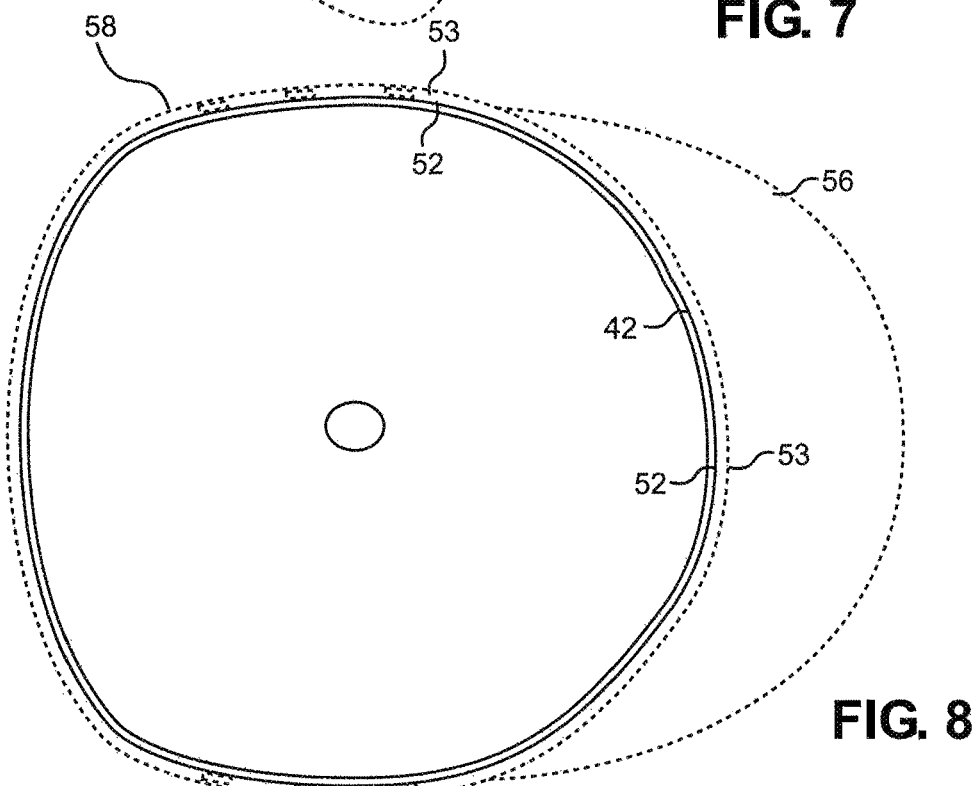
FIG. 8 depicts an overhead sectional view of a planar configuration of the device which may be engaged within the interior circumference of headwear as in FIGS. 7, 9, and 11.

As depicted in FIG. 7, as in other embodiments disclosed above, the body 42 is formed in a circular or substantially annular configuration, similar to the shape of a hat 56 (See FIG. 8). Also shown in FIG. 7 are recesses 50 formed into the edge 54 of the bottom side 44 of the body 42. Additionally shown are securing fasteners 52 which are complimentary to and removably engageable with mating securing fasteners 53 of the hat 56 (See FIG. 8) and thereby used for removable securement of the hat 56 to the body 42.

FIG. 8 shows an overhead sectional view of a planar configuration of the body 42 of the device 40. As noted, this embodiment of the device 40 being thinner may be hidden from view with the device 40 in the as-used position and engaged within the interior circumference of headwear, such as a hat 56. Also shown are the securing fasteners 53, which are engaged or affixed to the interior of the hat 56 and removably engage with the securing fasteners 52 on the body 42 of the device 40.

Figure 9:
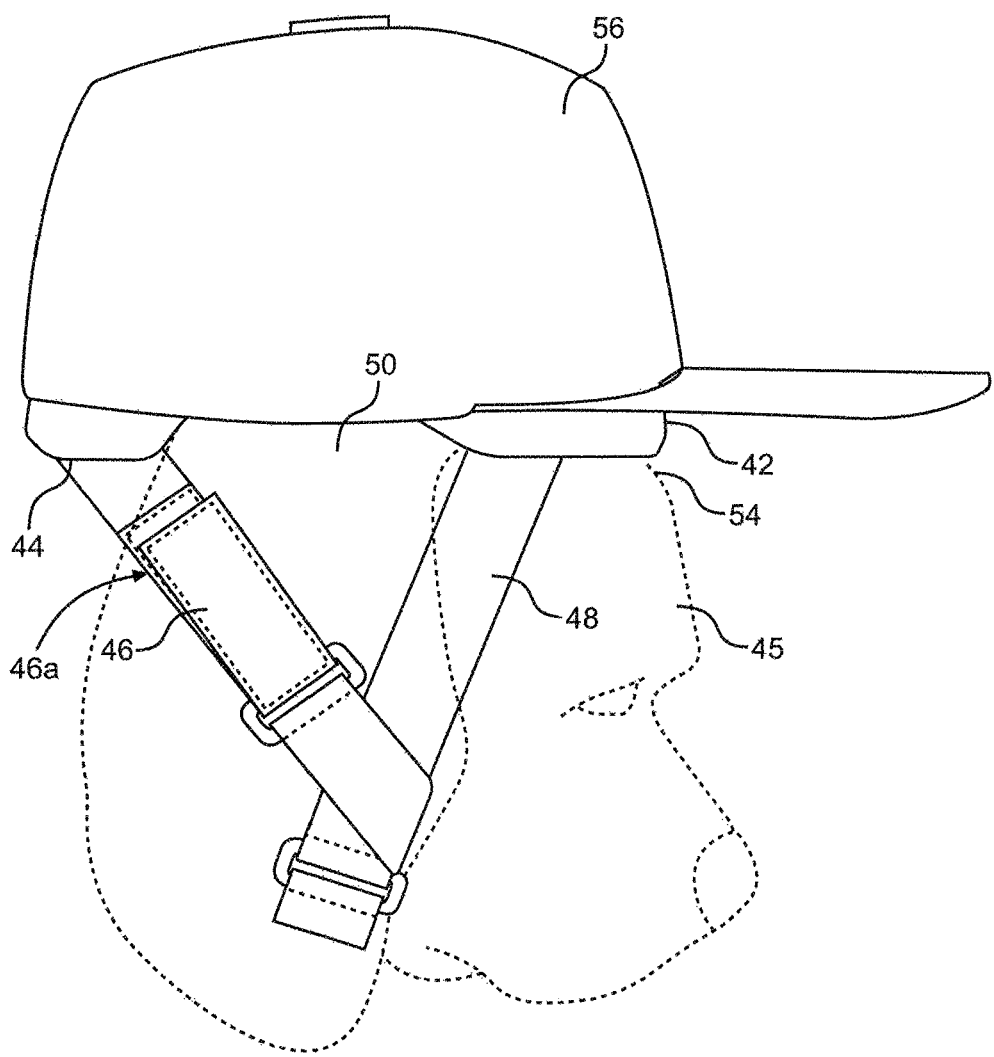
FIG. 9 depicts headwear engaged upon the exterior of the body of the device such as that in FIG. 7, and showing the securing straps and ear cutouts formed in the body of the device.

FIG. 9 depicts a hat 56, engaged upon the exterior of the body 42 of the device 40 such as that in FIG. 7 and showing the body 42 in an as-used position, and the hat 56 removably engaged with the body 42. As can be seen, the recess 50 at opposing edges 54 of the bottom side 44 of the body 42, provide a pathway for comfortable communication of the ears of the animal 45. The body 42 so mounted with the primary straps 48 and secondary strap 46 is especially secure and it has been found that providing the pathway for the ears using the recesses 50, increases the secure positioning by preventing rotation and other relative movement of the body 42 and hat 56 on the head of an animal 45. The body 42, being of a more rigid form than the hat 56, absorbs some or all of the tension caused by engaging the fasteners, thereby maintaining the shape of the hat 16 more closely to its original form.

As shown in FIG. 9, secondary strap 46 further comprises an adjustable fastener 46A, which utilizes complementary portions of a hook and loop material to secure the secondary strap 46 in place. In a preferred method of use, the secondary strap 46 is adjusted using the adjustable fastener 46A after the device 40 is place on the animal's 45 head, thereby creating a custom and secure fit between the device 40 and the animal 45. It is to be appreciated by someone skilled in the art that other types of fasteners may be used without departing from the spirit and scope of the present invention. For example, the adjustable fastener 46A may use a buckle or clips to secure the distal end of the fastener 46A after it is adjusted to the desired size.

Shown in FIG. 10 is a depiction of the more planar embodiment of the present invention and generally referred to as 70. Device 70 comprises the body 72 of the device 70 herein. FIG. 10 depicts the ability to pre-insert, or engage the body 72 within the interior circumference of the hat 86. The body 72 in this embodiment can be permanently engaged within a pocket or by sewing into the interior circumference of the hat 86, or, it may be removably engaged by insertion into hat 86 and engagement of the securing fasteners 83 in the interior of the hat 86 with the mating securing fasteners 82 on the sidewall 74 of the body 72.

Additionally shown in FIG. 10, is a preferred embodiment of the present invention, wherein the opposing sides of the hat 86, have openings 88 formed therein. These openings 88 are complimentary in shape to the recesses 80 formed into the body 72 of the device 70.

In use, to form the support necessary to maintain the hat in a substantially circular configuration upon the head of the animal 75, the body 72 is positioned into the hat 86 with the openings 88 registered in position adjacent the recesses 80. This provides a preferred pathway for the ears of an animal wearing the hat 86 with the body 72 secured to hold the shape and positioning of the hat 86 when positioned on the head of an animal 75, as shown in FIG. 11 and described below.

Figure 12:
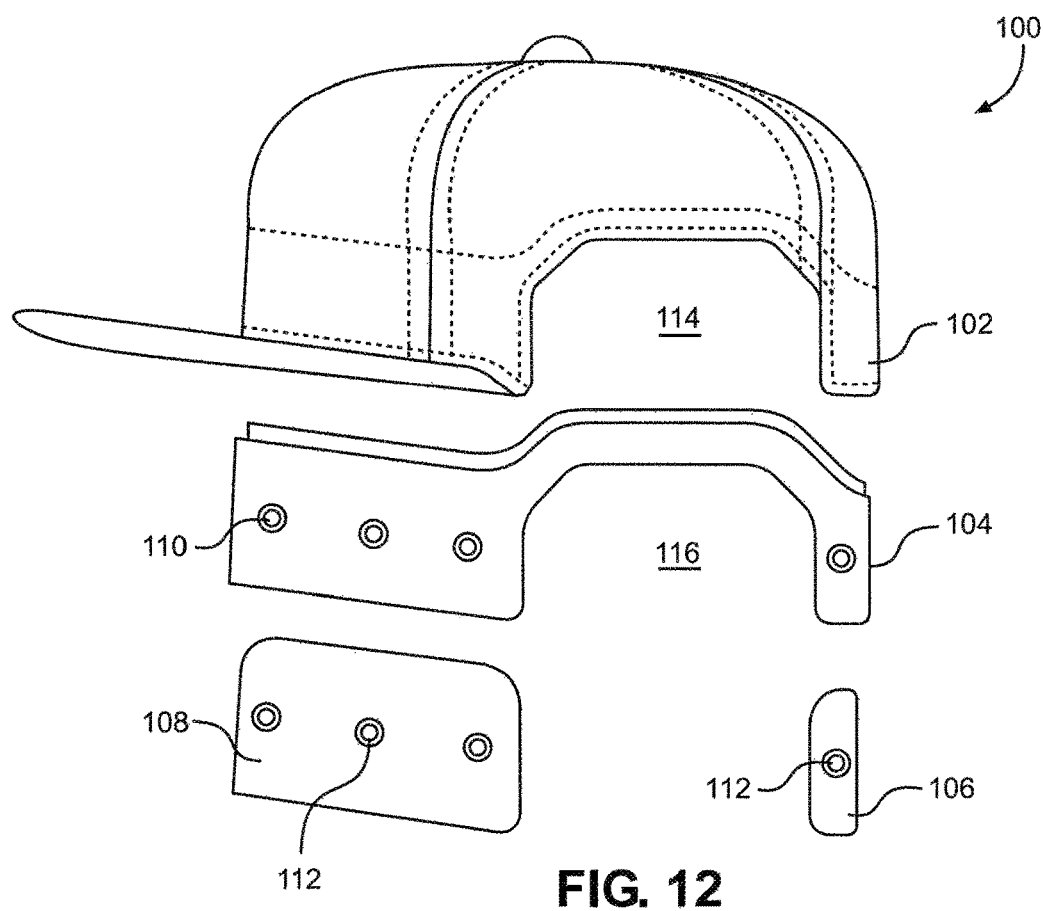
FIG. 12 shows yet another embodiment of the present invention having a body formed from multiple components.
Figure 13:
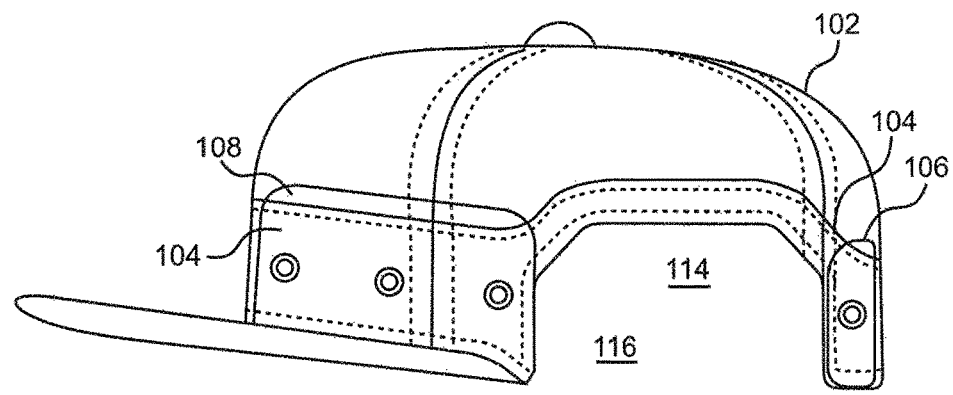
FIG. 13 depicts the embodiment as shown in FIG. 12 operatively engaged with a hat.
Figure 14:
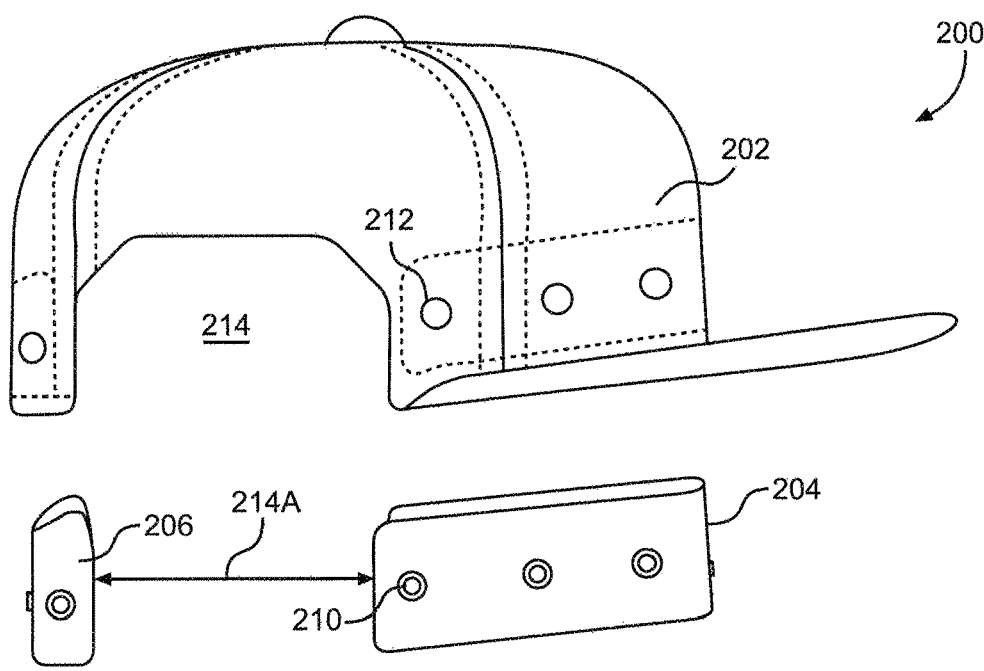
FIG. 14 shows another alternative embodiment of the present invention having a body formed in half sections that engage with the hat only at front and rear positions on opposite sides of the gap.
Figure 15:
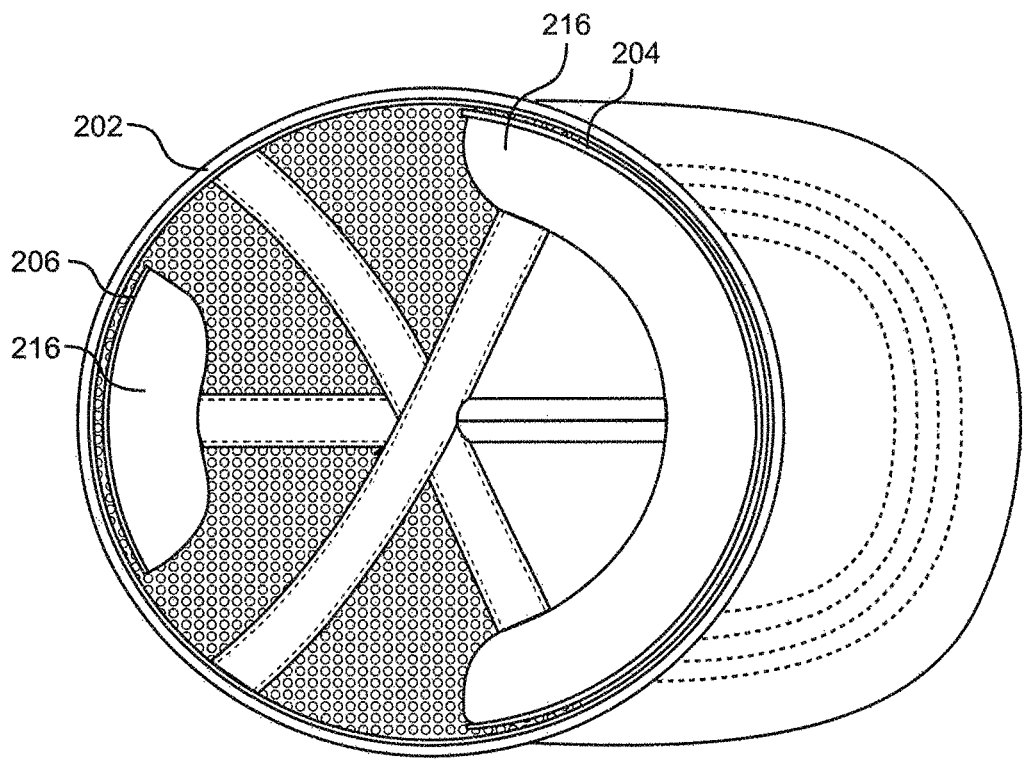
FIG. 15 depicts a bottom view showing the embodiment as in FIG. 14 engaged within a hat.

Further regarding FIG. 11, while the body 72 provides support for the circumference and shape of the hat 86 as a single annular component as shown in FIG. 10, this should not be considered to be limiting as the body 72 can be formed in multiple components, as shown in FIGS. 12 and 13, to support the hat's 86 circumference, or can be formed such as in FIGS. 14-15 where multiple components 204 and 206 form the body and are engaged to the hat 202 on opposing sides of the openings 214, and support the shape of the hat circumference by a curved shape and engagement to front and rear portions of the hat 202 on opposing sides of the openings 214.

As noted, FIG. 11 depicts the body 72 as in FIG. 10, operatively engaged in an as-used position, attached to the circumference of the hat 86 adjacent a lower edge 79 with defines the circumference and opening of the hat 86 into which the head of an animal dog 75 is operatively positioned. The hat 86 may be provided in combination with the body 72 formed as a single annular component or as multiple components, or since the body 72 in all embodiments is adapted to engage the circumference of the hat 86 adjacent the lower edge 79, users can form openings 88 to fit their animal's 75 head, and then engage the body 72 by engagement of the securing fasteners 82 on the body 72 to mating securing fasteners 83 which can be positioned in a hat 86 by the user. Means for positioning the mating securing fasteners 83 are shown in FIGS. 12 and 14. Other means for positioning of the mating securing fasteners 83 can be employed such as adhesive, pins, clips, or the like, so as to allow a mating fastener engagement of the securing fasteners 82 to mating securing fasteners 83, to thereby hold the body 72 to the hat 86.

Figure 16:
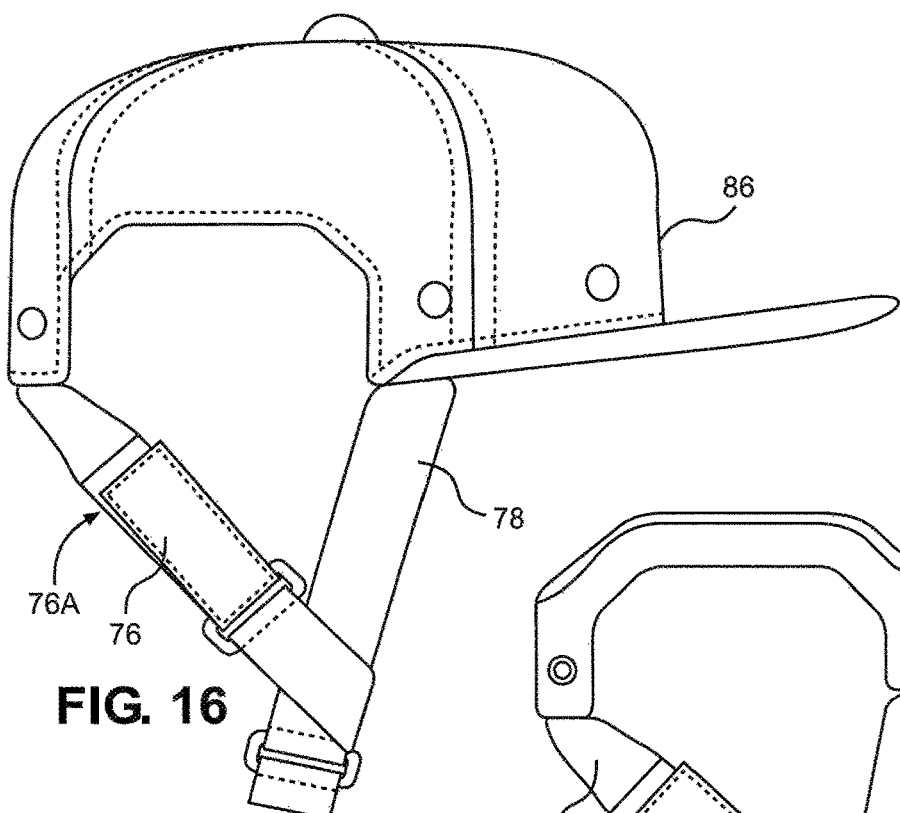
FIG. 16 shows straps for the present invention engaged with the body at the lower edge of the hat.

Additionally shown in FIG. 11 are the primary straps 78 secured under the neck of an animal 75, and the secondary straps 76 with adjustable fastener 76A extend between the rear of the body 72 to the primary straps 78. These straps 76 and 78 may be secured to the body 72 such as in FIG. 17, in embodiments of the present invention herein where the body 72 is engaged to a hat 86 using a mating fastener engagement. This will allow any hat 86 to be used and mated with the body 72. Alternatively the straps 76 and 78 can be engaged to a hat 86 provided in combination with a body 72 such as shown in FIG. 16 where the straps 76 and 78 may be permanently or removably engaged adjacent the lower edge 79 of the hat 86. Further, either the body 72 or the hat 86 itself if provided, can include engagement positions adapted for engagement of straps 76 and 78, such as the strap apertures 304 shown in FIG. 18, in the hat 86 but which can be formed in the body 72.

FIG. 12 shows another embodiment of the present invention and generally referred to as 100. Device 100, which includes mounts 106 and 108 which have mating securing fasteners 112 positioned thereon. The mounts 106 and 108 provide a way to securely position the mating securing fasteners 112 such that they may engage with the securing fasteners 110 on the body 104 engaged to the inside of the hat 102. The body 104 may be engaged to the hat 102 with adhesive, clips, pins, snaps, or other fasteners adapted to secure the body 104 with the hat 102.

Shown in FIG. 13 is the device 100 with the mounts 106 and 108 engaged with the body 104 by engaging the fasteners 112 on the mounts 106 and 108 to the fasteners 110 on the body 104, which is secured inside the hat 102. The body 104, being of a more rigid form than the hat 102, absorbs some or all of the tension caused by engaging the fasteners, thereby maintaining the shape of the hat 102 more closely to its original form.

FIG. 14 shows another alternative embodiment of the present invention and is generally referred to as 200. Device 200 comprises a front mount 204 and a rear mount 206 capable of being operatively engaged with the hat 202 at front and rear positions as shown in FIG. 15, on opposite sides of the opening 214, which corresponds to the gap 214A between the front mount 204 and the rear mount 206.

As noted, FIG. 15 depicts a bottom view of the device 200 showing the body components 204 and 206 as in FIG. 14 engaged within the hat 202. It should be appreciated by someone skilled in the art that a foam material 216, or other material capable of forming or being formed to the head of an animal, may be used in conjunction with the body components 204 and 206 to create a more secure and comfortable fit while helping to maintain the original shape of the hat 202.

FIG. 16 shows another alternative embodiment of the present invention wherein the primary straps 78 and the secondary straps 76 with adjustable fastener 76A, to hold the hat 86 engaged with the body 72 on the animal (not shown), can be engaged at or adjacent the lower edge 79 inside of the hat 86.

Figure 17:
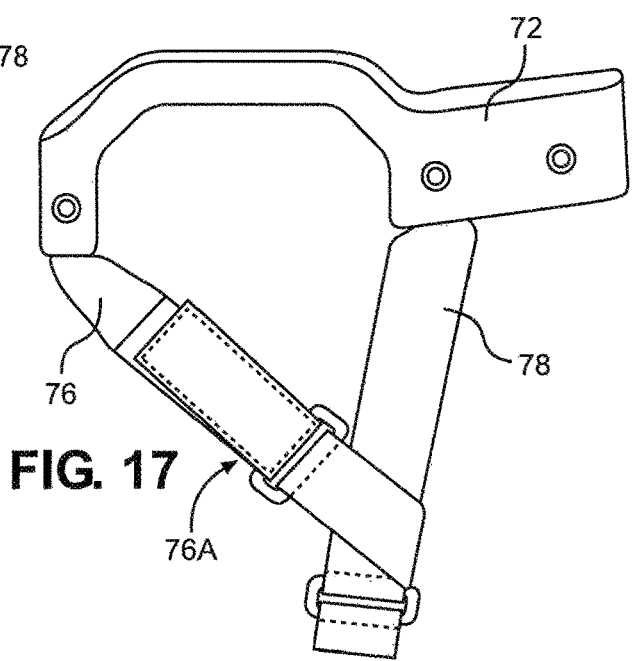
FIG. 17 depicts straps engaged with the body.

FIG. 17 depicts the straps 76 and 78 engaged with the body 72, without the hat 86 shown. As noted, the body 72 also engages with the inside circumference of the hat 86 at or adjacent the lower edge 79 of the hat 86.

Figure 18:
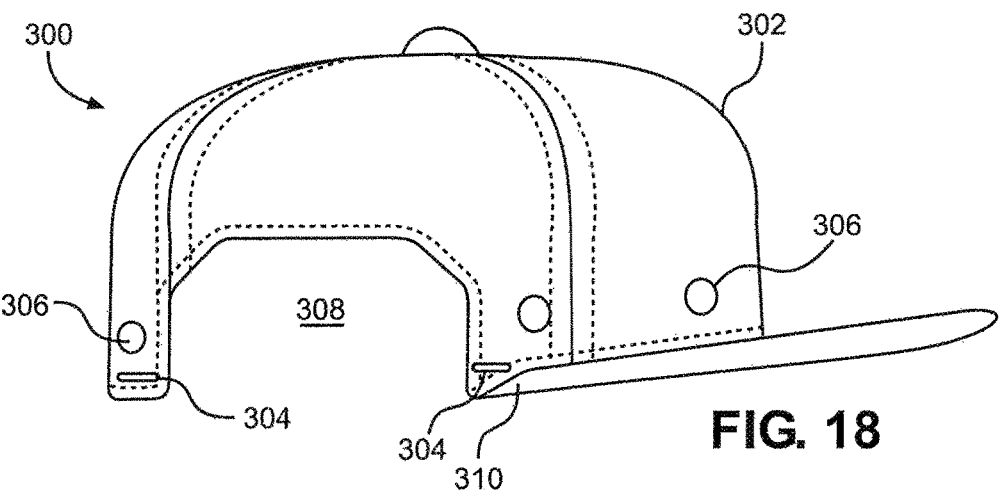
FIG. 18 depicts strap engagement points located on a hat for the user to employ an alternative set of straps to secure the hat to an animal's head.

FIG. 18 shows yet another alternative embodiment of the present invention and is generally referred to as 300. Device 300 provides strap engagement apertures 304 on hat 302 and located on both sides of opening 308 along bottom edge 310 of hat 302. Apertures 304 are configured to receive one end of a strap, similar to straps 76 and 78. The apertures 304 allow a user to employ custom straps or other articles capable of securing the present invention to the head of an animal. Some preferred embodiments of hat 302 have fasteners 306 for engagement with the fasteners of the bodies described herein.

Figure 19:
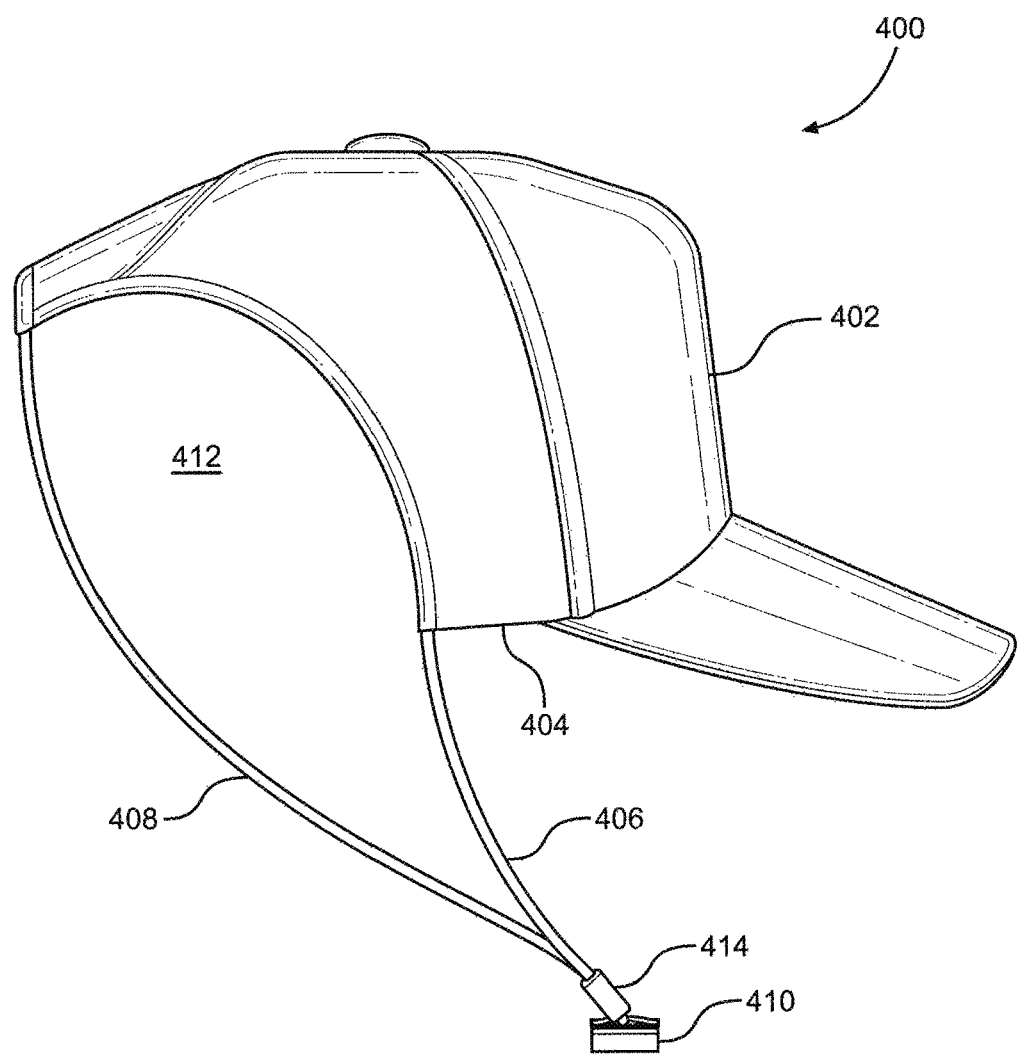
FIG. 19 is a side view of an alternative embodiment of the present invention having an extended side portion.

FIG. 19 depicts another embodiment of the present invention and generally referred to as 400. Device 400 includes a hat 402 having a recess formed by opening 412 positioned to accommodate the ear of an animal. Opening 412 is positioned such that extended side 404 is formed on both sides of the hat 402 to allow for a better fitment to an animal's head. Front strap 406 connects to the hat 402 at the intersection of the opening 412 and the extended side 404. Rear strap 408 connects to the hat 402 at the intersection of opening 412 and rear portion of the hat 402. Front strap 406 and rear strap 408 connect to fastener 410 through slide adjuster 414.

To use device 400, a user positions the device 400 on an animal's head such that the animal's ears align with opening 412 and secures the straps 406 and 408 around the animal's neck by securing fastener 410. The distal ends of front strap 406 and rear strap 408 are secured into a fastener 410. The user then uses slide adjuster 414 to adjust the lengths of the front strap 406 and the rear strap 408 relative to each other to create a custom and comfortable fit on the animal's head.

Fastener 410 may be one portion of a hook and loop fastener, a clip, a hook, or any other method of fastening known in the art. As will be discussed below with FIG. 20, device 400 has a complementary strap located on the opposing side of the device 400. Once the distal ends of straps 406 and 408 at connected around the neck of the animal to a complementary portion of fastener 410, the user adjusts the slide adjuster 414 so that the device 400 properly fits the animal's head, thereby securing the device 400 on the animal's head.

Figure 20:
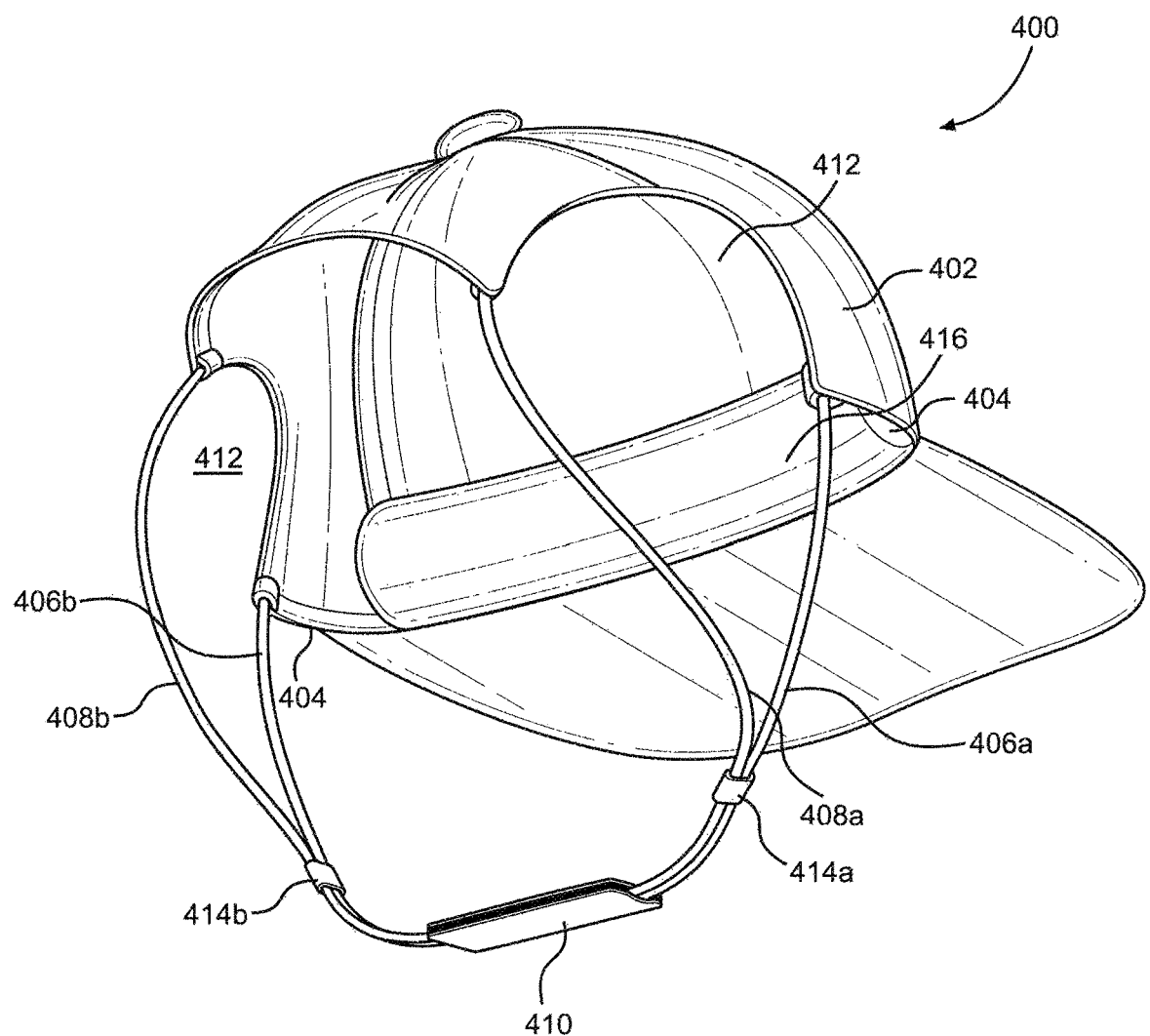
FIG. 20 is a bottom right perspective view of another alternative embodiment of the present invention having a lining to facilitate adaptation to an animal's head.

FIG. 20 shows a bottom right perspective view of device 400. As shown, and as discussed above, front strap 406 comprises a right front strap 406a and a left front strap 406b. Rear strap 408 comprises right rear strap 408a and left rear strap 408b. Right front strap 406a and right rear strap 408a connect to fastener 410 through right slide adjuster 414a. Left front strap 406b and left rear strap 408b connect to fastener 410 through slide adjuster 414b. As described above, to use the device 400, a user places the device 400 on an animal's head, secures the straps 406 and 408 around the animal's neck by securing fastener 410, then adjusts slide adjusters 414a and 414b until the device 400 properly sits on the animal's head.

In a preferred embodiment of device 400, fastener 410 comprises complementary portions of a hook and loop fastener. When securing the device 400 to the animal's head, proper fitment is achieved by overlapping the complementary portions of the fastener 410 until the device 400 is properly held in place on the animal's head, then the complementary portions to the fastener 410 are connected to hold the device 400 on place.

Also shown in FIG. 20 is insert 416 which is attached to the inside front of the hat 402 with fasteners, hook and loop, or other methods used in the art. In a preferred embodiment, insert 416 is made from an open or closed cell foam, however it is to be appreciated by someone skilled in the art that insert 416 may be constructed from other materials such as rigid or semi-rigid plastics or a gel-like material. Insert 416 allows for a comfortable fit between the hat 402 and the animal's head to provide for proper spacing between the device 400 and the animal's head, such that the hat rests above the animal's eyes thereby allowing the brim of the hat 402 to properly shield the animal's eyes from the sun.

Figure 21:
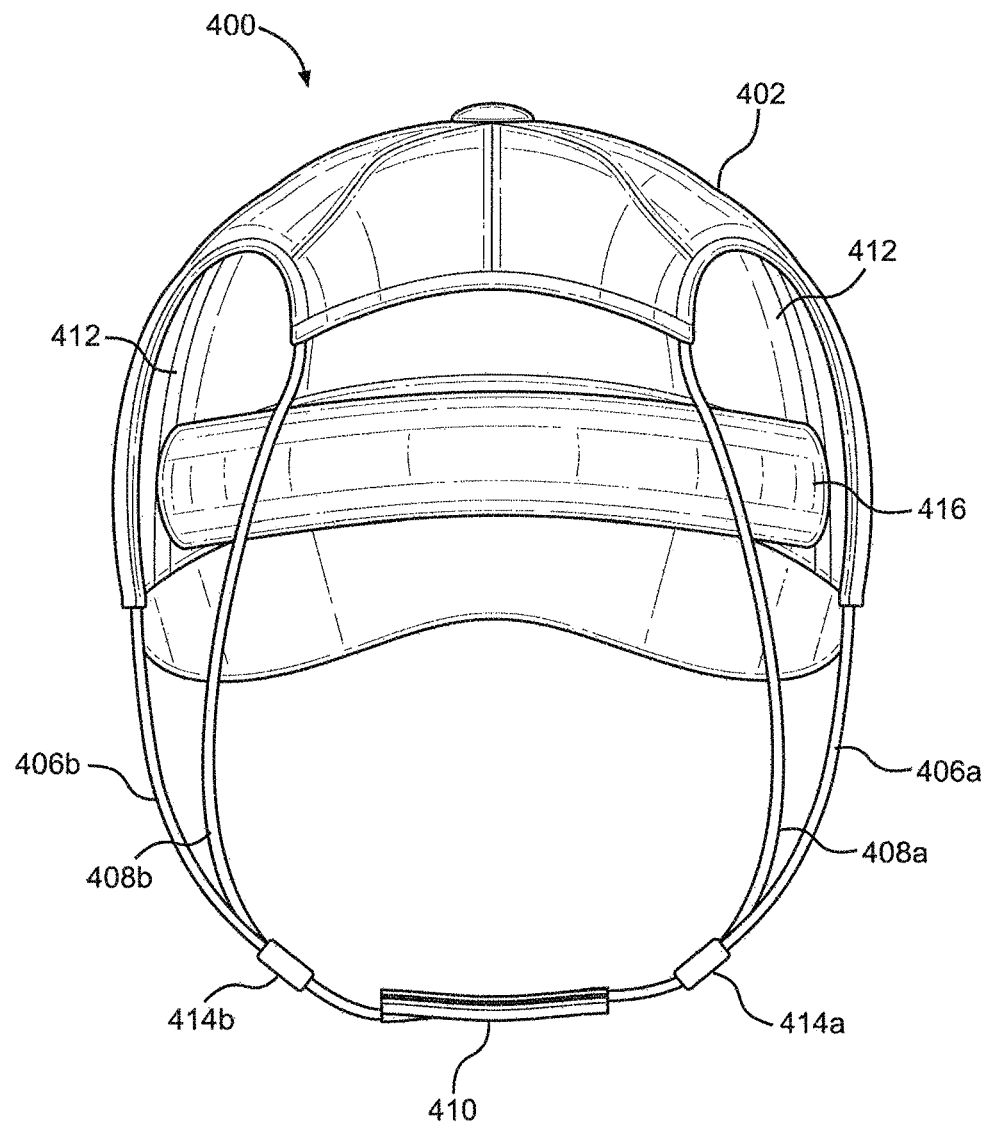
FIG. 21 is a rear view of the alternative embodiment shown in FIG. 20 also showing the lining.

FIG. 21 is a rear view of device 400 showing the placement of straps 406a, 406b, 408a, and 408b. Also shown is insert 416 positioned on the inside front portion of device 400. As can be seen in FIG. 21, when the complementary portions of fastener 410 are connected, the device is configured for a secure fit onto an animal's head.

Figure 22:
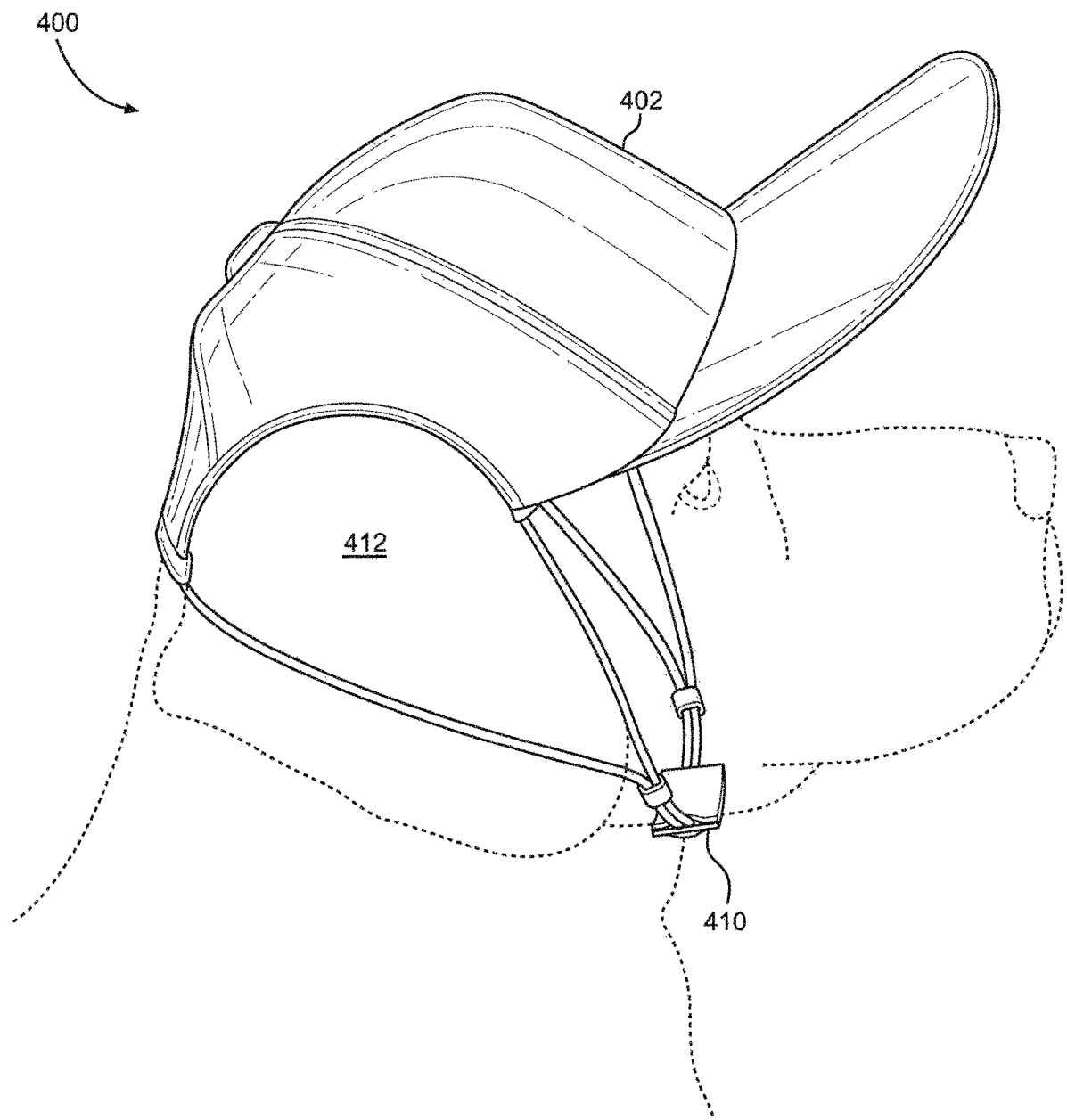
FIG. 22 is a side view of the alternative embodiment shown in FIG. 20 in an as-used condition.

FIG. 22 is a side view of device 400 in an as-used condition. As shown, fastener 410, when connected, holds device 400 on the animal's head. Also shown is the relationship between the animal's ears and opening 412. As shown in this figure, when properly placed on an animal's head, device 400 will shield the animal's eyes and head from the sun.

Figure 23:
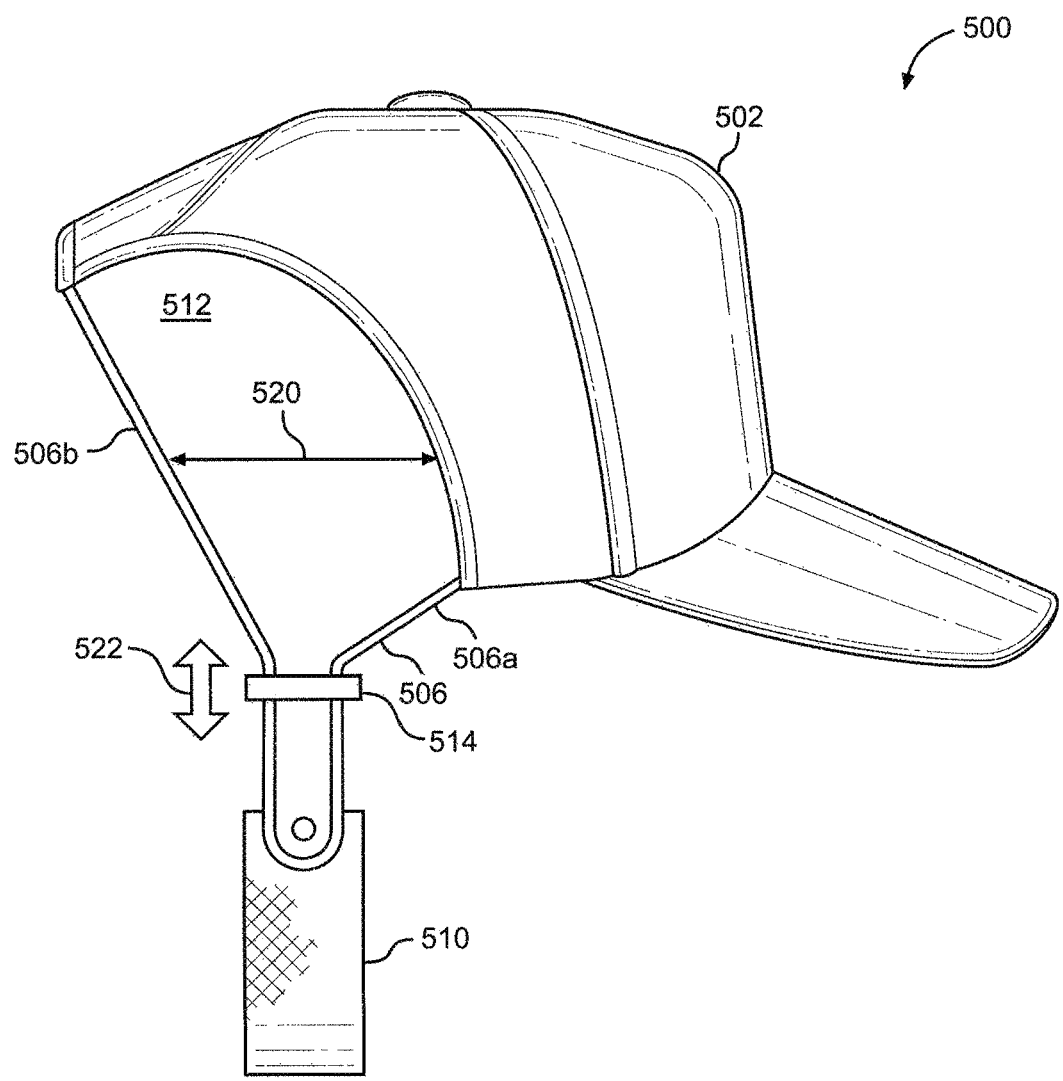
FIG. 23 is a side view of yet another alternative embodiment of the present invention having an adjustable strap system to allow proper fitment onto an animal's head.

Moving now to FIG. 23, an alternative embodiment of the present invention is shown and generally referred to as 500. Device 500 comprises a hat 502 with openings 512. Strap 506 connects to the front portion of recess or opening 512 and to the rear portion of opening 512. In this embodiment, strap 506 is a continuous piece of material. Strap 506 is laced through the slide adjuster 514 and the fastener 510 such that the slide adjuster 514 and the fastener 510 may slide forward or backward along strap 506. In use, a user first positions the device 500 on the head of an animal. The user then slides slide adjuster 514 and the fastener 510 in direction 520, thereby positioning the fastener 510 such that the strap 506 can be secured around the animal's neck such that the tension on strap section 506a and section 506b are relatively equal. Once the fastener 510 is secured under the animal's neck to a complementary fastener (not shown), the slide adjuster 514 can adjusted along direction 522 until the device 500 properly fits on the animal's head, including around the animal's ears.

FIG. 24 shows an alternative embodiment of fastener 510 compared to FIG. 23. In this embodiment, fastener 530 has a portion 536 folded over and attached along seam 532. This creates channel 534, which is sized to receive a strap, such as strap 506. It should be noted that this design also allows strap 506 to slide freely through channel 534 thereby allowing for proper adjustment. Fastener 530 may comprise at least one portion of a hook and loop fastener. However, it should be appreciated by someone skilled in the art that other types of complementary fasteners, such as snaps, hooks, and buttons, may be used and are fully contemplated by the inventor. In use, a user connects fastener 530 to a complementary fastener on a strap (not shown) disposed on the other side of the device 500.

FIG. 25 shows yet another alternative embodiment of a fastener used to attach the present invention to an animal's head. In this FIG., fastener 540 has a portion 546 folded over and attached along seam 542 thereby creating a channel 544. Strap 506 is then free to slide through channel 544. As with fastener 530, fastener 540 may be constructed from hook and loop fasteners, snaps, buttons, and hooks.

FIG. 26 shows another embodiment of a fastener 550 similar to fasteners 530 and 540. In this embodiment, fastener 550 comprises a first fastener portion 550a and a second fastener portion 550b, both of which are attached to pin 552. This scheme allows for fastener 550 to move freely with respect to the strap 506. In use, after sliding the fastener 550 forward or backward along strap 550, the strap 550 is connected to a complementary fastener (not shown) under the animal's neck thereby securing the present invention to the animal while equalizing the tension along the strap 506. In one particular embodiment, fastener 550a and 550b have one portion of a hook and loop fastener disposed on the inside of the fastener 550. The complementary fastener (not shown) has the complementary portion of the hook and loop fastener disposed on the outside of the complementary fastener. This allows for both sides of the fastener 550a and 550b to be secured to the complementary fastener instead of one thereby increasing the holding strength of the fastener 550 to allow for the present invention to be better held in place during use, such as when running or playing catch while outdoors in the sun.

In a method of employing any embodiment of the present invention herein, a user could form headwear, such as a baseball cap to, include openings in both sides of the cap extending toward the top of the cap from a lower edge thereby creating recesses configured to fit around an animal's ears.

Figure 27:
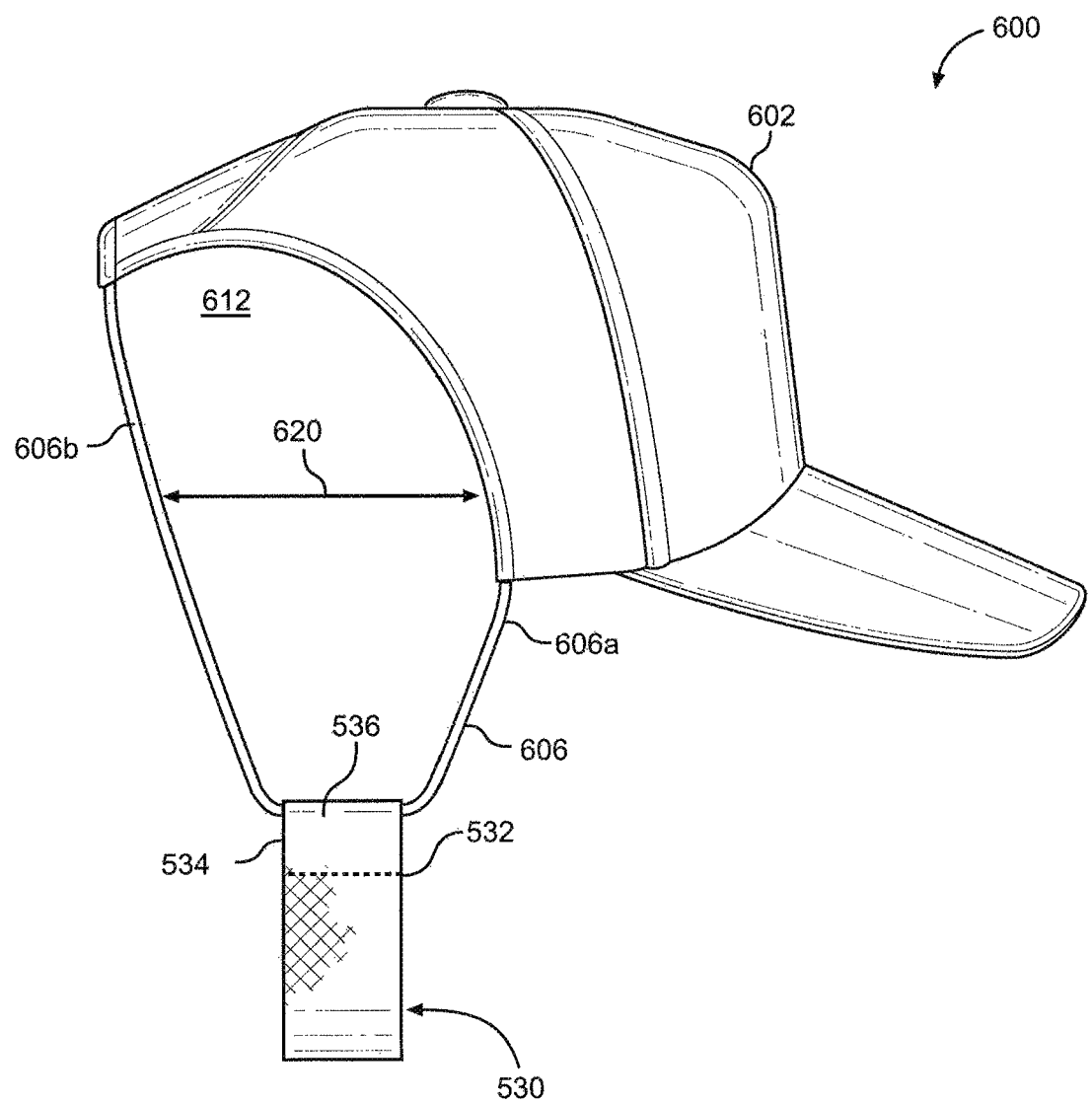
FIG. 27 is a side view of yet another alternative embodiment of the present invention having an adjustable strap system to allow proper fitment onto an animal's head.

Referring now to FIG. 27, an alternative embodiment of the present invention is shown and generally referred to as 600. Device 600 comprises a headgear 602, such as a baseball cap with a rigid bill as shown, with openings 612. On each side of headgear 602, a strap 606 connects to the front portion of recess or opening 612 and to the rear portion of opening 612. In this embodiment, strap 606 is a continuous piece of material. Fastener 530 includes a portion 536 folded over and attached along seam 532 and creates the channel 534, which is sized to receive the strap 606. The fastener 530 includes one portion of a hook and loop fastener. Strap 606 is laced through the channel 534 of the fastener 530 such that the fastener 530 may slide forward or backward along strap 606.

In use, a user first positions the device 600 on the head of an animal. The user then slides the fastener 530 in direction 620, thereby positioning the fastener 530 such that the strap 606 can be secured around the animal's neck such that the tension on strap section 606a and section 606b are relatively equal. The same is performed for the strap 606 and fastener 530 located on the opposite side of the headgear 602. The fastener 530 on each side is then secured to one another under the animal's neck to secure the headgear 602 to the animal.

As shown, the headgear 602 is a baseball cap with a rigid bill. The use of a hat as shown in FIG. 27 is not meant to be limiting, and it is contemplated that the headgear 602 may be used all types of headwear, such as a hats, caps, visors, bonnets, helmets, hoods, headbands, head scarves, wimples, or any type of headgear to be worn on top of a head. It is contemplated that the headgear 602 may be any type of headgear without departing from the spirit and scope of the invention.

Figure 28:
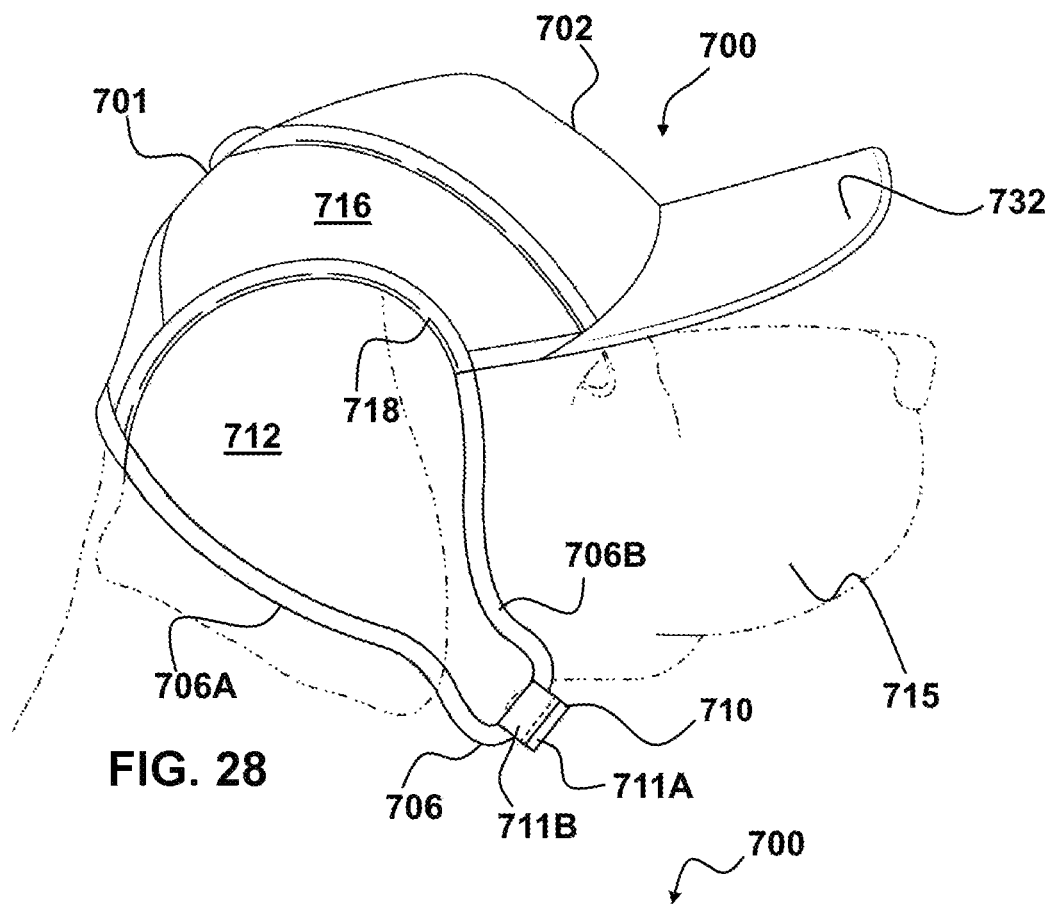
FIG. 28 shows a right side view of a mode of the device having a plurality of front straps slidably engaged to a releasable fastener allowing a front and rear positioning of the fastener in reflation to the front and rear of the hat.

Referring now to FIGS. 28-41 wherein the hat is referred to as device 700, there can be seen in FIG. 28 a mode of the device 700 having a slidably engaged releasable fastener 710 positioned in a sliding engagement 705. This sliding engagement 705 slides at both of opposing ends of the fastener 710, upon a first strap or right strap 706 and second strap or left strap 707 (FIG. 30). By sliding engagement 705 (FIG. 31) is meant a sliding connection of the fastener 710 upon the first or right strap 702 and upon the second or left strap 707, with respective opposite ends of the fastener 710, either using fasteners such as rings or eyelets or the like engaged to the fastener 710, or as shown, by formation of respective passages through and on opposite ends of the fasteners 710 through which the first or right side strap 706 and second or left side strap 707 are slidably engaged.

The fastener 710 is formed of a first fastener portion 711A and second fastener portion 711B which are removably engageable to each other using cooperative fasteners positioned on each thereof. Currently, hook and loop fabric is a preferred cooperative fastener to form the fastener 710 as it is flexible and can be engaged in an elongated fashion across a majority of the area of both the first fastener portion 711A and second fastener portion 711B thereof, for a very secure connection. However, one or a combination of cooperative fasteners from a group including hook and loop fabric, snaps, buttons, clips, magnets, or grommets may be employed to form the removable engagement between the first fastener portion and second fastener portion.

As shown in the various views of the device 700 in FIGS. 28 to 33, a right strap 706 is connected at distal ends to the body 701 of the hat 702, at respective opposed ends to the right side opening 712 which as noted in the above modes of the device herein is formed into a lower edge of a right side portion 716 or first side portion of the body 701 forming the hat 702. This right side opening is preferably formed with a curved edge as such has shown to work well in adapting the right side opening 712 for positioning of the ear of a dog therein.

Figure 29:
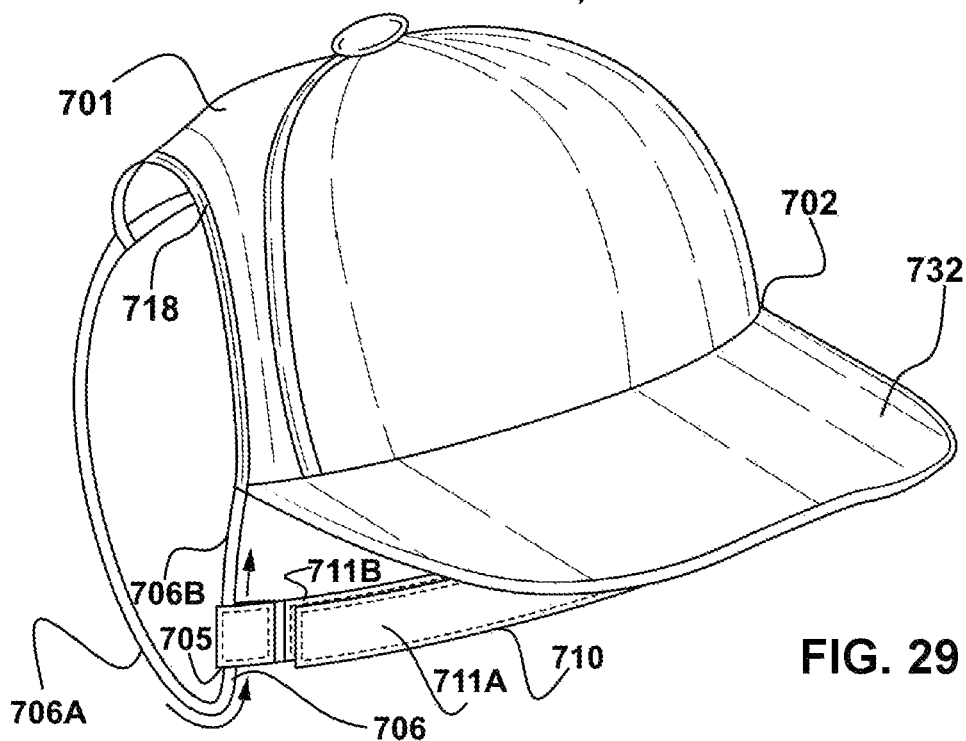
FIG. 29 depicts the hat device of FIG. 28 in a front right perspective view thereof showing the fastener slid to a frontal position on the hat.
Figure 30:
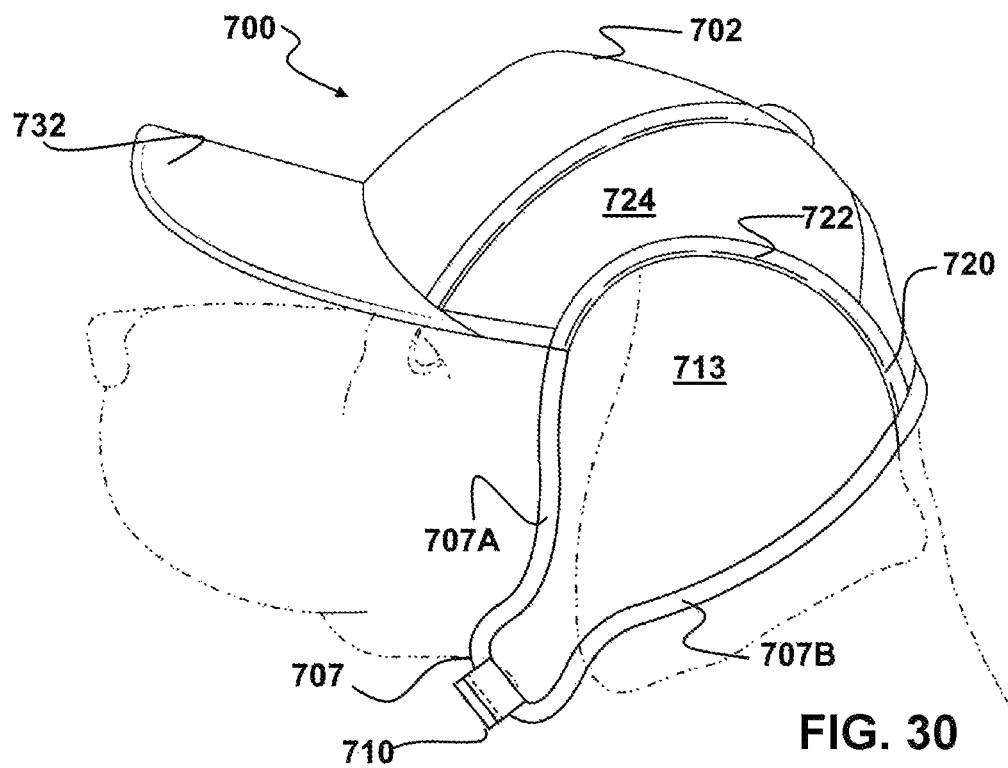
FIG. 30 depicts a left side view of the hat device of FIG. 28 in an opposite view.
Figure 31:
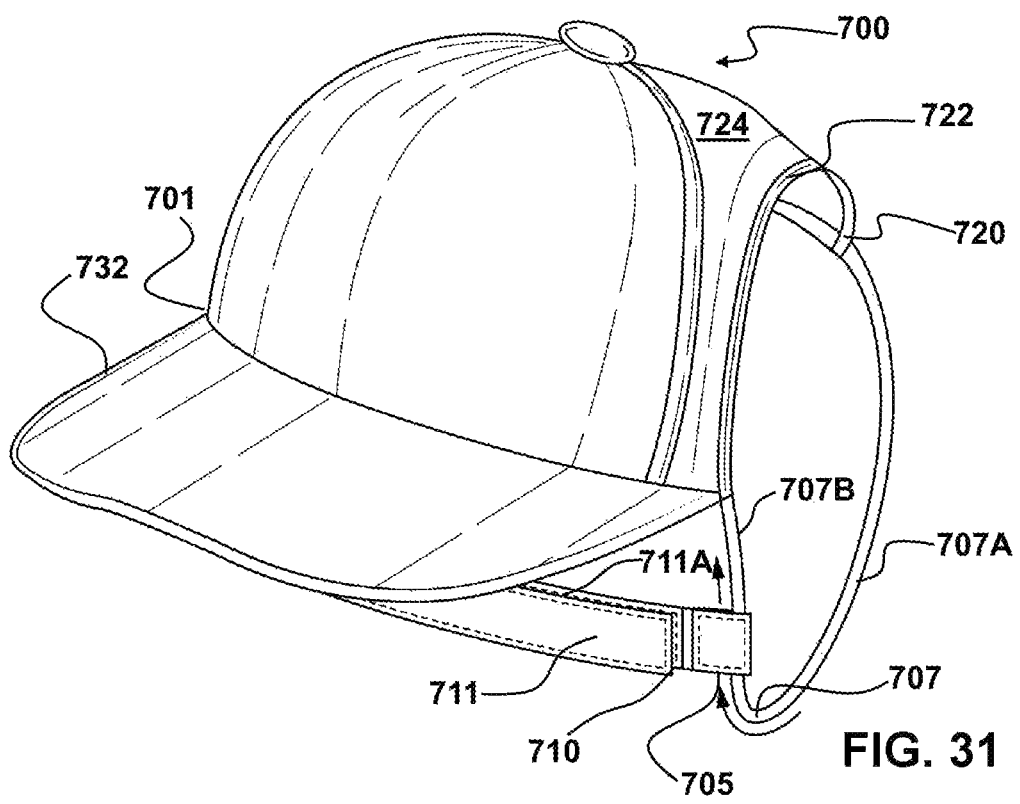
FIG. 31 shows a front right perspective view of the hat device of FIGS. 28-30.
Figure 32:
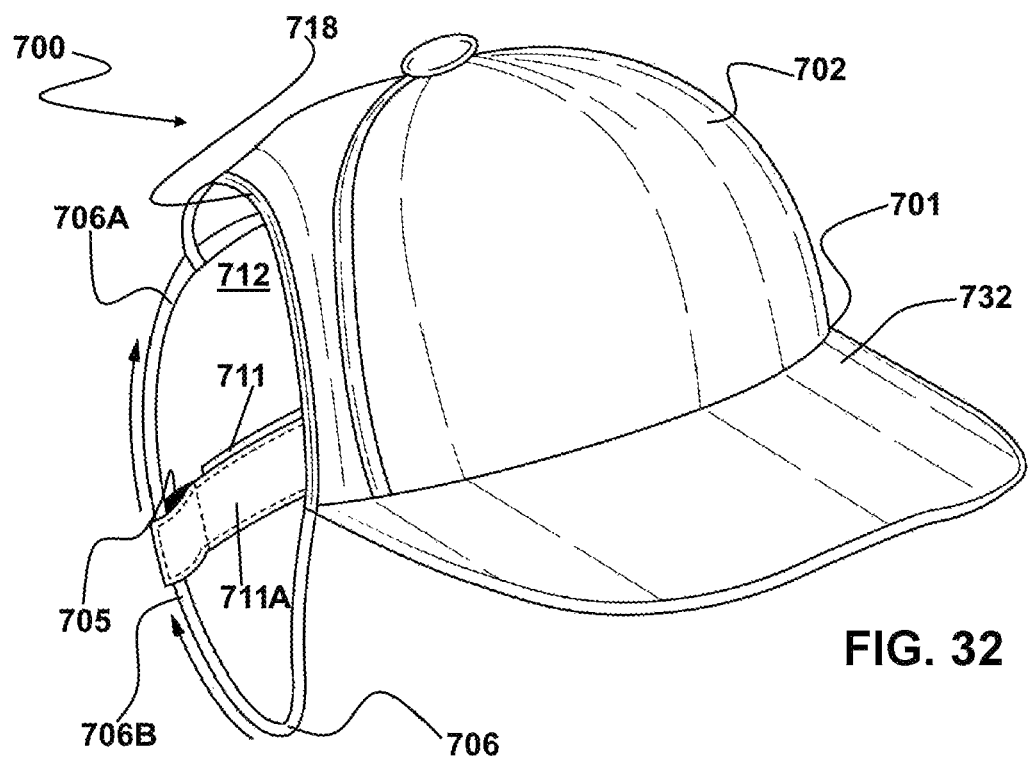
FIG. 32 shows a front right perspective view of the hat device as in FIGS. 28-31, with the fastener slid to a rearward position upon the straps.
Figure 33:
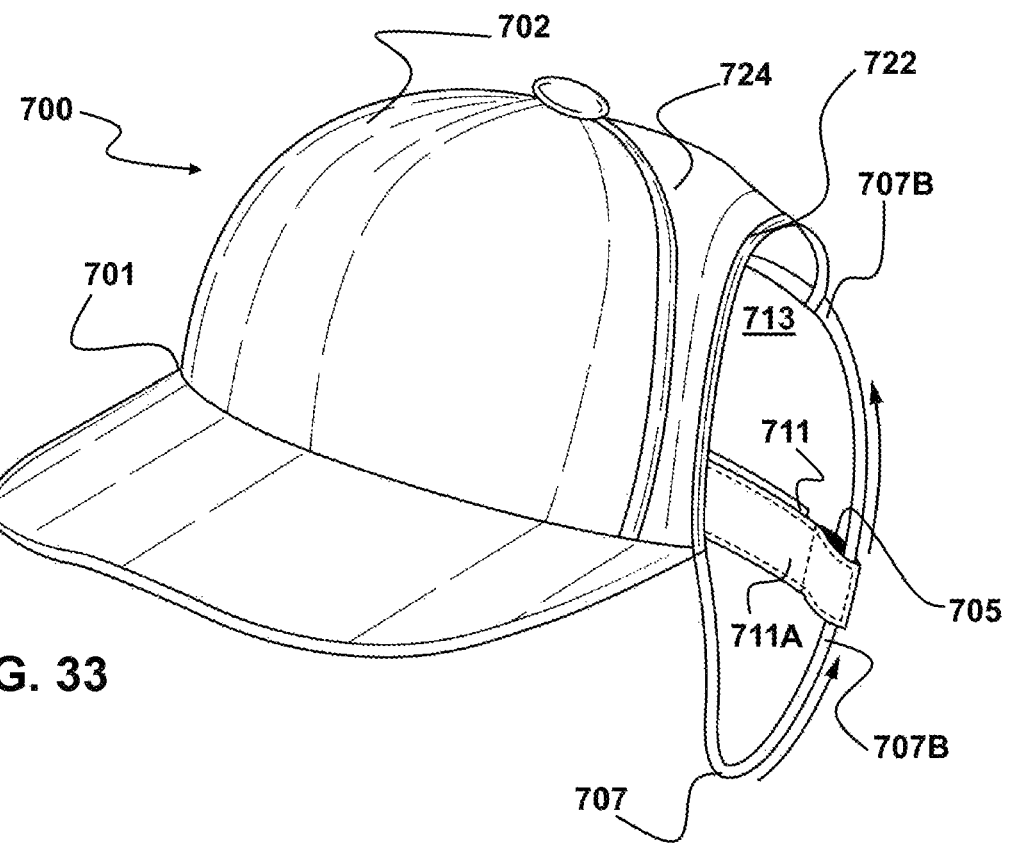
FIG. 33 shows a front left perspective view of the hat device of FIG. 32.

As can be seen in FIGS. 28, 29, and 32, the right side opening 712 formed at the lower edge of the right side portion 716 of the body 701, has an interior area, surrounded by the right strap 706 and by the right curved edge 718 or first curved edge, which is formed into and defining a shape of the lower edge of the right side portion 716 of the body 701. The opposite configuration is shown in FIGS. 30, 31, and 33, wherein the left side opening 713 is surrounded by the left strap 707 and the second curved edge or left curved edge 722, defining a curved lower edge of the left side portion 724, or second side portion, of the body 701 forming the hat. This curved left lower edge 722 is preferred as it has been shown during experimentation, to best accommodate the ear of a wide variety of dogs positioned within the left side opening 713 since some dogs were shown to have ears positioned higher on their heads and some lower. While a linear left and right lower edge was initially tired, the curving of the lower edges on both sides was found to better accommodated the wider diversity of breeds who might wear the cap.

As shown in the device 700 of FIG. 29, and noted above, the fastener 710 in the sliding engagement 705 upon the right strap 706, and left strap 707, can be positioned in a frontal location as in FIG. 29, or slid to a rearward location as in FIGS. 32 and 33. This allows the user to place the fastener 710 in a position relative to the hat body 710, which best accommodates the head structure of the animal on which it will sit. For examples animals with a long snout, would do well with the fastener in the frontal position as in FIG. 29, and animals without a long snout or having a flat face, would do well with the fastener 710 in the rearward position of FIGS. 29 and 33.

As also noted above, the device 700 is also shown in FIGS. 34-41, which depict the hat 701, which also includes the sliding engagement 705 of a separable fastener 710 which is slidably engaged on opposing ends thereof with the first or right strap 706 and second or left strap 707. It thus can be moved in its position from the frontal location as in FIG. 40 below the bill 732 of the hat, to a more rearward positioning as in FIG. 41 on the rear side of the hat which is opposite the bill 732. This positioning of the separable fastener 710 will depend on the position of the a first slide adjuster 725, slidably engaged upon the right strap 706, and the second slide adjuster 727, slidably engaged upon the left strap 707. Such a re-positioning of the fastener 710 can be seen in FIGS. 38-39, and 40-41.

Figure 35:
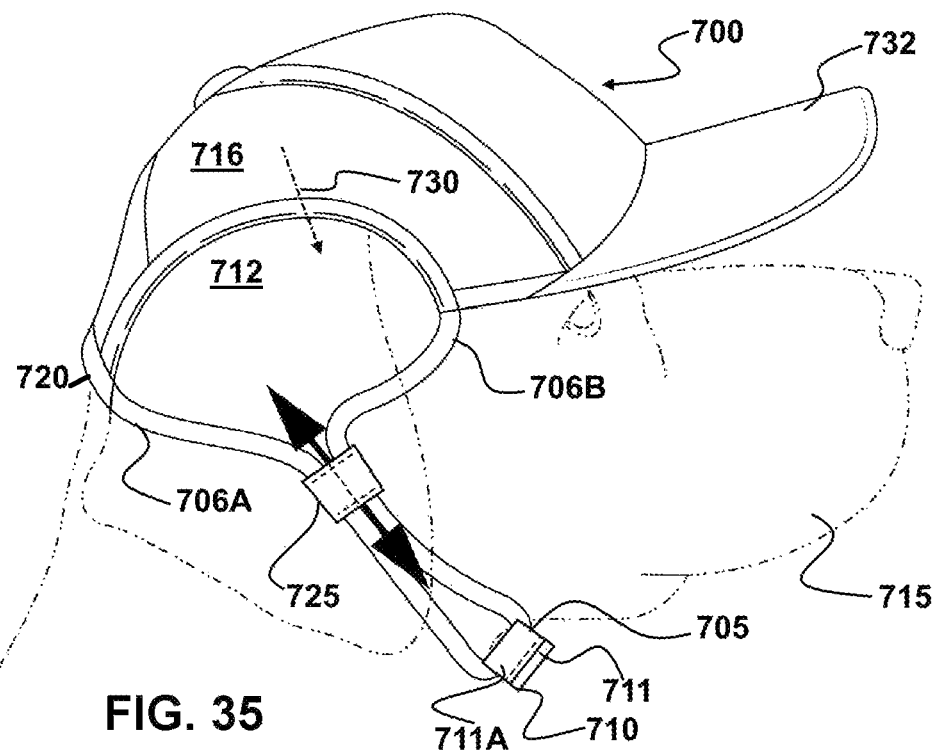
FIG. 35 depicts the hat device as in FIG. 34, but showing the slide adjuster translated to a position closer to the side opening of the hat to decrease the size thereof.
Figure 38:
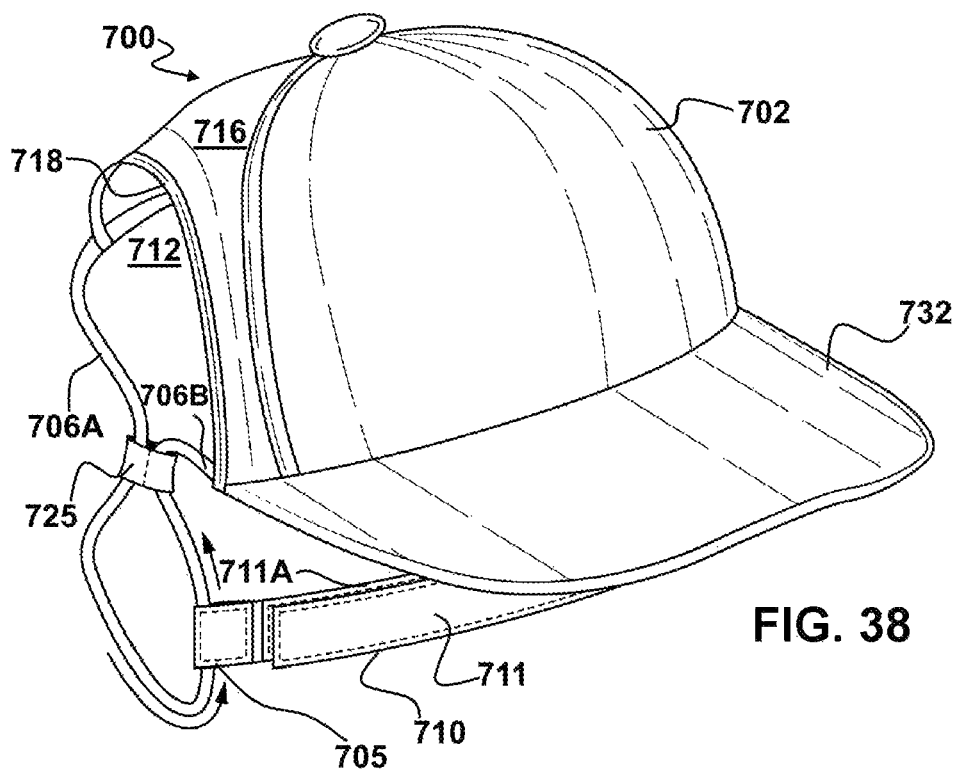
FIG. 38 shows a front right perspective view of the device as in FIG. 35 and showing the slidable fastener translated to the frontal position on the hat body.
Figure 39:
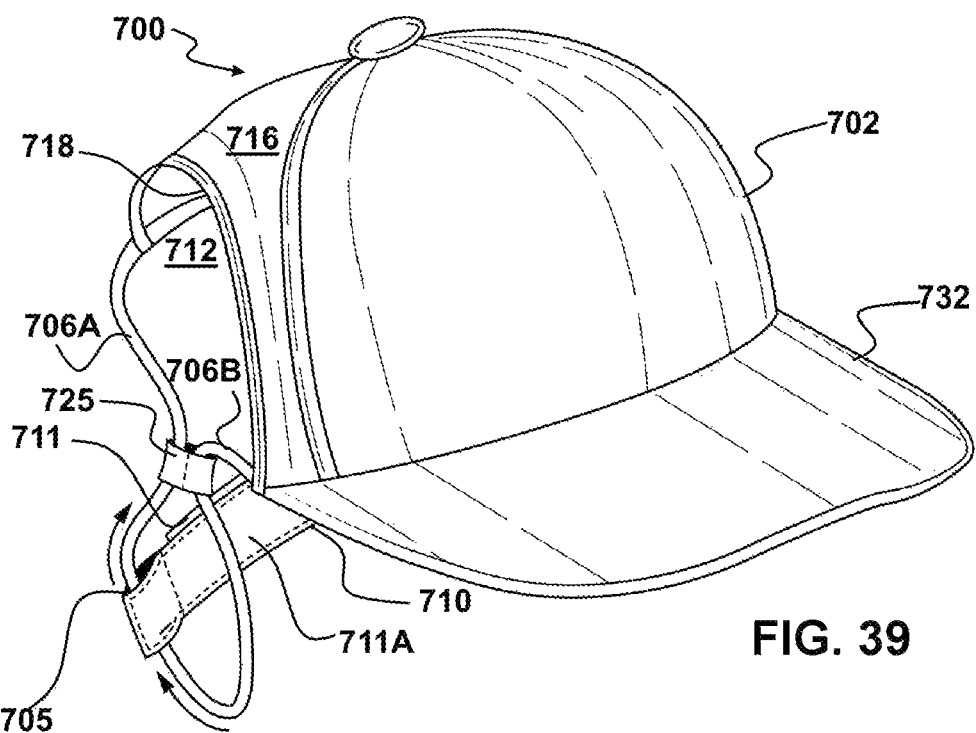
FIG. 39 shows the hat device herein as in FIG. 38, but with the fastener slide to a rearward positioning upon the straps.
Figure 40:
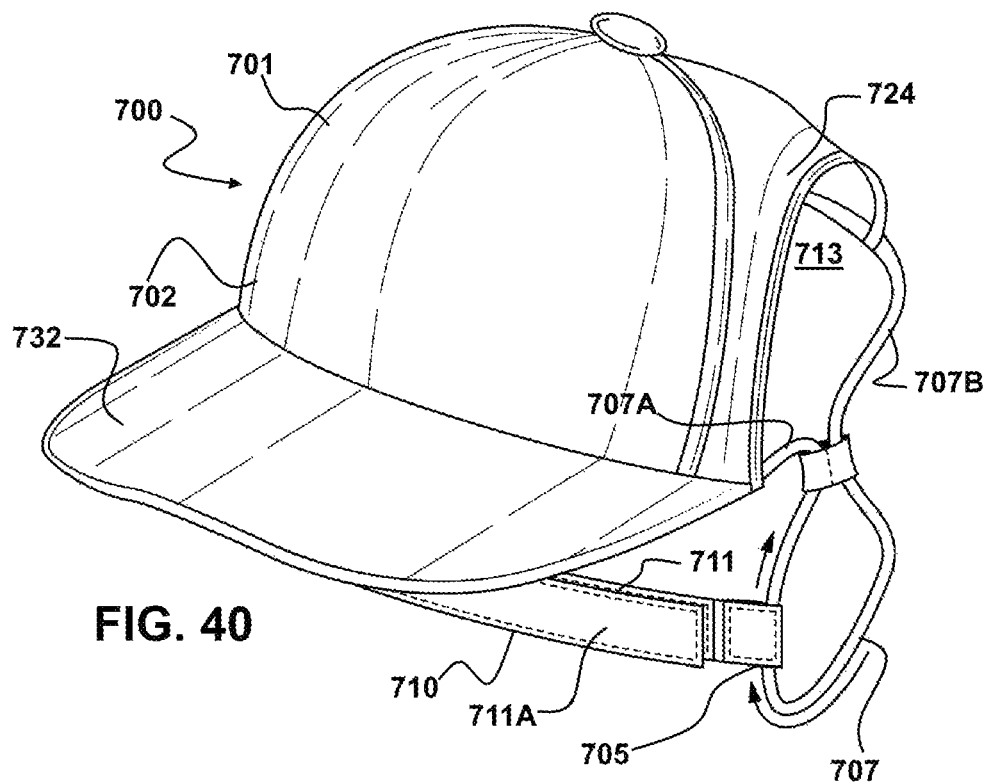
FIG. 40 shows the hat device as in FIG. 38, from the opposite side perspective view.
Figure 41:
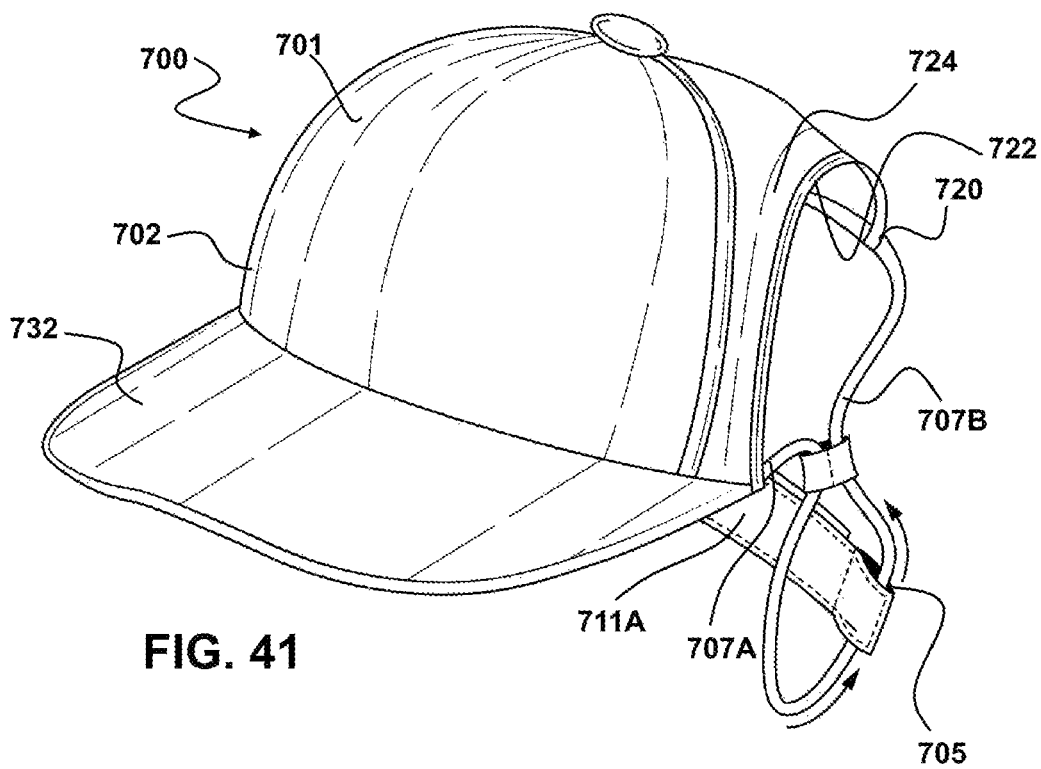
FIG. 41 depicts the hat device as in FIG. 39, from the opposite side perspective view therefrom.

Additionally included with the separable fastener 710, are a first slide adjuster 725 which is slidably engaged upon the first or right side strap 702, and a second slide adjuster 727 which is slidably engaged upon the second or left strap 707. As shown in FIGS. 35, 38 and 39, the right strap 706 is looped through the sliding engagement 705 with the separable fastener 710. This looped engagement forms the right strap 706 to a right rear portion 706A and a right front portion 706B, communicate in the sliding engagement through the first slide adjuster 725.

Figure 34:
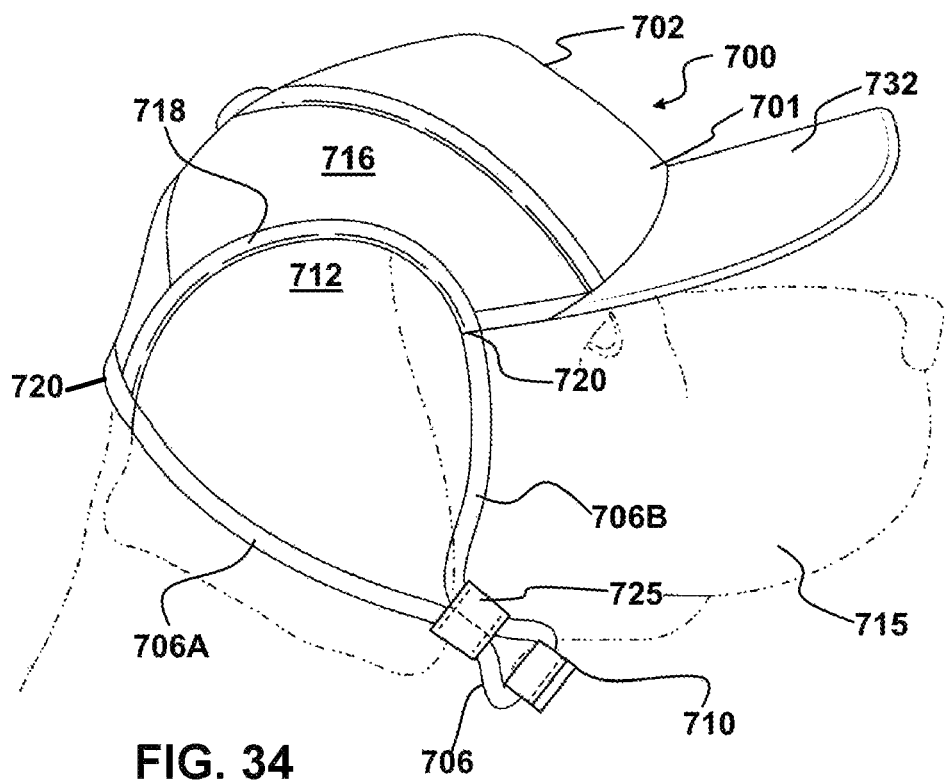
FIG. 34 depicts another mode of the hat device of FIGS. 28-33, with a slide adjuster operative engaged upon the straps adjacent the fasteners, which is positionable for size adjustment of side openings.

When the first slide adjuster is moved from a first positioning adjacent the engagement 105 with the fastener 710, as shown in FIG. 34, in a direction toward the lower edge 720 of the body 701, to a second positioning as in FIG. 35, it tensions the engagement of the distal ends of the right strap 706 engaged with the lower edge 720 of the body 701. This tensioning imparts a downward force 730 to the body 701 of the hat 702 toward the head of the animal 715 on which it is engaged. In this fashion it tightens the engagement on the head to form a compressive engagement between the fastener 710 when in the frontal position of FIGS. 35 and 37 under the bill. The compressive engagement is adjustable by movement of the first and second slide adjusters 725 and 727.

Figure 36:
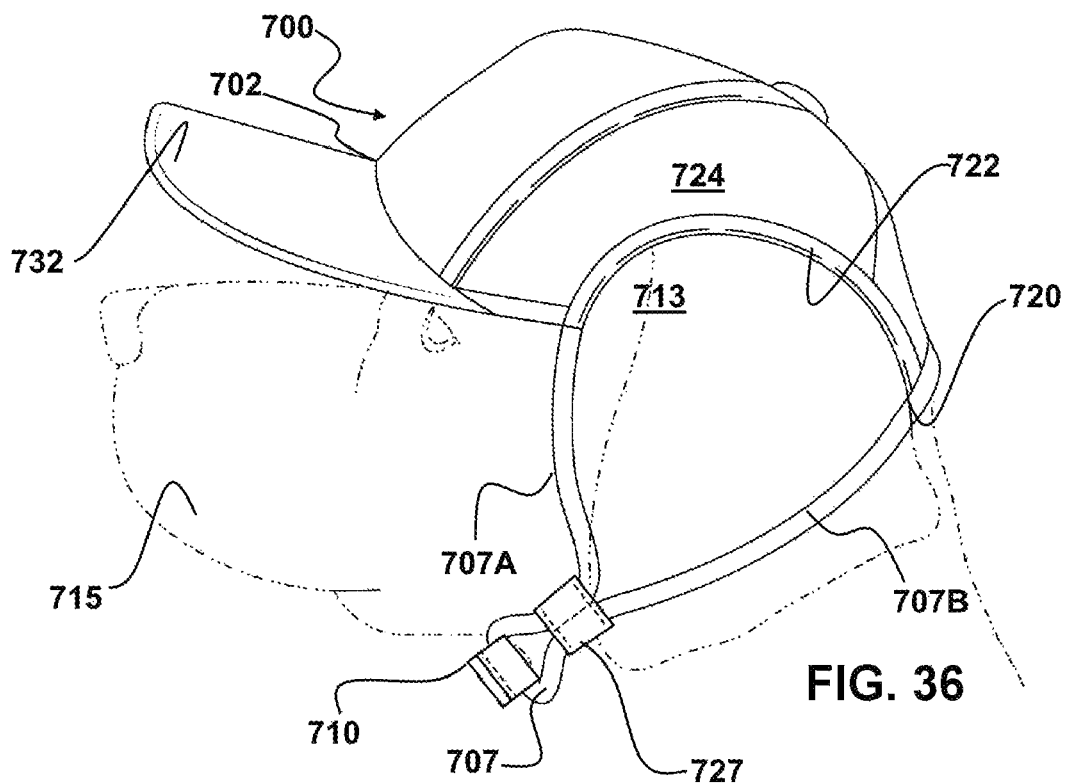
FIG. 36 is a left side view of the had device as in FIG. 34.
Figure 37:
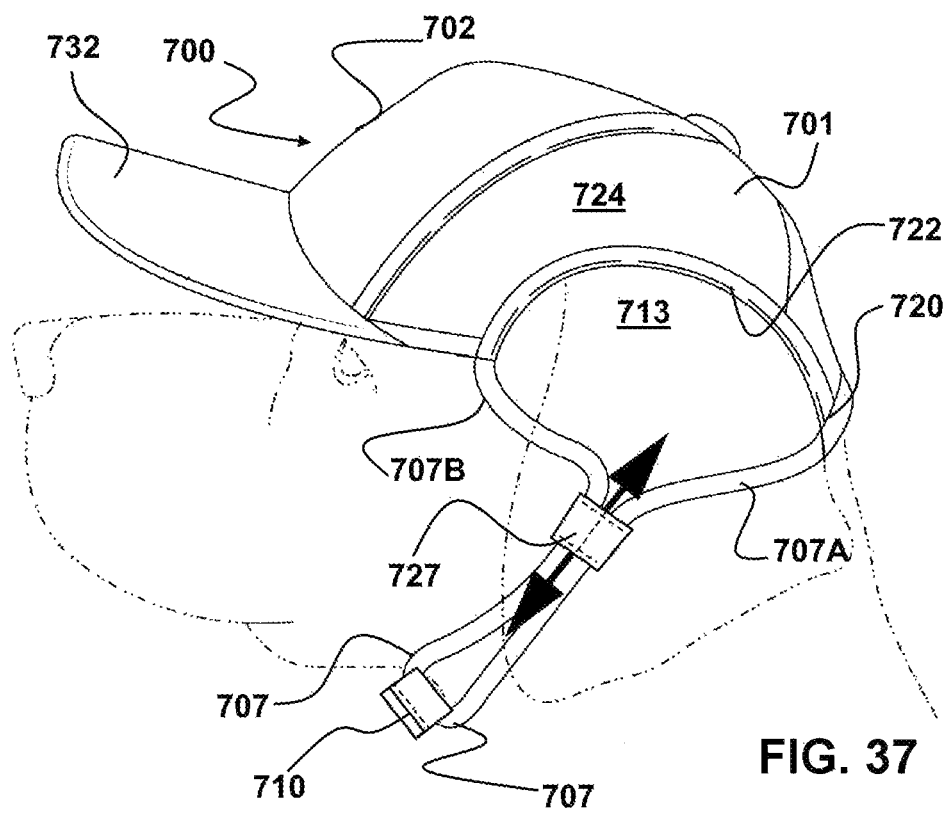
FIG. 37 is a left side view of the device as depicted in FIG. 35.

The same is true of the second sliding adjuster 727 slidably engaged on the second or left strap 707. The second or left strap 707 is also in a looped sliding engagement 105 with the fastener 710. This looped engagement forms the left strap 707 to a left rear portion 707A and a left front portion 706B, which both communicate in the sliding engagement through the second slide adjuster 727. When the second slide adjuster 727 is moved from a first positioning adjacent to the fastener 710, as shown in FIG. 36, in a direction toward the lower edge 720 of the body 701 to a second positioning as in FIG. 37, it tensions the engagement of the distal ends of the second or left strap 706 connected to the lower edge 720 of the body 701. This tensioning also imparts a downward force 730 of the hat 702 toward the head of the animal 715 on which it is engaged, and forms a compressive engagement of the head of the animal, between the fastener 710 when in the frontal position and the body 701 of the hat 702. The more the force of compression the tighter the engagement of the hat 702 on the head of the animal 715.

Of course, the first slide adjuster 725 and second slide adjuster 727 are independent, and can thus be slid independently toward respective second positions closer or further from the lower edge 720 of the body 701, to impart the downward force 730. This would accommodate heads of animals 715 which are uneven. This independent movement of the slide adjusters also allows for an angled positioning of the hat 702 on the head of the animal 715 where the bill 732 would be at an angle to an imaginary line running between the eyes of the animal 715 when viewed from the front.

While all of the fundamental characteristics and features of the interface device allowing for comfortable and secure engagement of headwear to animals, such as dogs, have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope and spirit of the invention as set forth. It should also be understood that various substitutions, modifications, and variations may be made by those skilled in the art without departing from the spirit or scope of the invention. Consequently, all such modifications, variations, and substitutions are included within the scope of the invention as defined by the following claims.

What is claimed is:

1. A headwear apparatus for positioning on the head of an animal, comprising:
   a body, said body having a first side portion and a second side portion;
   said body having a front side extending between said first side portion and said second side portion, said front side positioned opposite a rear side of said body;
   a first strap extending between a first end thereof and a second end thereof;
   said first end of said first strap in a first connection to said first side portion at a fixed position thereon adjacent said front side of said body;
   said second end of said first strap in a second connection to said first side portion at a fixed position thereon adjacent said rear side of said body;
   a first opening defined by an area between said first strap and a first edge portion of said first side portion, said first edge portion forming a first curved edge located between said first connection and said second connection of said first strap thereto;
   said first opening having a first arched portion thereof along said first curved edge for positioning there through of a first ear of an animal wearing said headwear;
   a second strap extending between a first end thereof and a second end thereof;
   said first end of said second strap engaged in a first connection thereof to said second side portion at a fixed position thereon adjacent said front side of said body;
   said second end of said second strap being engaged in a second connection thereof to said second side portion at a fixed position thereon adjacent said rear side of said body;
   a second opening defined by an area between said second strap and a second edge portion of said second side portion, said second edge portion forming a second curved edge located between said first connection and said second connection of said second strap thereto;
   said second opening having a second arched portion thereof along said second curved edge for positioning there through of a second ear of said animal wearing said headwear;
   said first and second curved edges respectively forming said first and second arched portions, both extending from a bottom of each side of the body upwardly to adjacent a top of the body, wherein each side of the body is substantially open to form a respective upper portion of both the first and second opening;
   a fastener, said fastener extending between a first end thereof and second end thereof;
   said fastener having a first fastener portion which is engageable in a removable engagement with a second fastener portion;
   said first end of said fastener in a first sliding engagement upon said first strap;
   said second end of said fastener in a second sliding engagement upon said second strap;
   said fastener being slidable along said first sliding engagement and along said second sliding engagement, between a frontal location below a bill projecting from said front side of said body and a rearward positioning adjacent said rear side of said body; and
   said fastener is configured to substantially engage the underside of the neck of the animal between the first and second end of the fastener when said fastener is at the frontal location.

2. The headwear apparatus of claim 1, additionally comprising:
   said first edge portion forming a first curved recess extending into said first side portion;
   said second edge portion forming a second curved recess extending into said second side portion.

3. The headwear apparatus of claim 1, additionally comprising:
   said removable engagement between said first fastener portion and said second fastener portion formed by cooperative fasteners positioned in each of said first fastener portion and said second fastener portion, said cooperative fasteners being from a group including hook and loop fabric, snaps, buttons, clips, magnets, or grommets.

4. The headwear apparatus of claim 2, additionally comprising:
   said removable engagement between said first fastener portion and said second fastener portion formed by cooperative fasteners positioned in each of said first fastener portion and said second fastener portion, said cooperative fasteners being from a group including hook and loop fabric, snaps, buttons, clips, magnets, or grommets.

5. The headwear apparatus of claim 1, additionally comprising:
- a first slide adjuster in a sliding engagement with both of a first portion of said first strap and a second portion of said first strap;
- said first portion of said first strap extending between said first connection of said first strap to said first side portion and said first slide adjuster;
- said second portion of said first strap extending between said second connection of said first strap to said first side portion and said first slide adjuster;
- a second slide adjuster in a sliding engagement with both of a first portion of said second strap and a second portion of said second strap;
- said first portion of said second strap extending between said first connection of said second strap to said second side portion and said second slide adjuster; and
- said second portion of said second strap extending between said second connection of said second strap to said second side portion and said second slide adjuster.

6. The headwear apparatus of claim 2, additionally comprising:
- a first slide adjuster in a sliding engagement with both of a first portion of said first strap and a second portion of said first strap;
- said first portion of said first strap extending between said first connection of said first strap to said first side portion and said first slide adjuster;
- said second portion of said first strap extending between said second connection of said first strap to said first side portion and said first slide adjuster;
- a second slide adjuster in a sliding engagement with both of a first portion of said second strap and a second portion of said second strap;
- said first portion of said second strap extending between said first connection of said second strap to said second side portion and said second slide adjuster; and
- said second portion of said second strap extending between said second connection of said second strap to said second side portion and said second slide adjuster.

7. The headwear apparatus of claim 3, additionally comprising:
- a first slide adjuster in a sliding engagement with both of a first portion of said first strap and a second portion of said first strap;
- said first portion of said first strap extending between said first connection of said first strap to said first side portion and said first slide adjuster;
- said second portion of said first strap extending between said second connection of said first strap to said first side portion and said first slide adjuster;
- a second slide adjuster in a sliding engagement with both of a first portion of said second strap and a second portion of said second strap;
- said first portion of said second strap extending between said first connection of said second strap to said second side portion and said second slide adjuster; and
- said second portion of said second strap extending between said second connection of said second strap to said second side portion and said second slide adjuster.

8. The headwear apparatus of claim 4, additionally comprising:
- a first slide adjuster in a sliding engagement with both of a first portion of said first strap and a second portion of said first strap;
- said first portion of said first strap extending between said first connection of said first strap to said first side portion and said first slide adjuster;
- said second portion of said first strap extending between said second connection of said first strap to said first side portion and said first slide adjuster;
- a second slide adjuster in a sliding engagement with both of a first portion of said second strap and a second portion of said second strap;
- said first portion of said second strap extending between said first connection of said second strap to said second side portion and said second slide adjuster; and
- said second portion of said second strap extending between said second connection of said second strap to said second side portion and said second slide adjuster.

* * * * *